United States Patent [19]
Hirohata et al.

[11] Patent Number: 5,568,329
[45] Date of Patent: Oct. 22, 1996

[54] AUDIO SIGNAL PROCESSING APPARATUS FOR HIGH SPEED OR FORWARD/REVERSE DIRECTION REPRODUCTION

[75] Inventors: Naoto Hirohata; Katsuyuki Shudo; Yuuki Miyazaki, all of Yokosuka, Japan

[73] Assignee: Victor Company of Japan, Ltd., Yokohama, Japan

[21] Appl. No.: 307,419

[22] Filed: Sep. 19, 1994

[30] Foreign Application Priority Data

Sep. 17, 1993 [JP] Japan .................................. 5-254705
Oct. 16, 1993 [JP] Japan .................................. 5-281690

[51] Int. Cl.$^6$ .................................................. G11B 5/00
[52] U.S. Cl. ............................................... 360/32; 360/8
[58] Field of Search ............................ 360/10.1, 10.3, 360/32, 51, 8

[56] References Cited

U.S. PATENT DOCUMENTS 5,010,421  4/1991  Arai ............................................ 360/32

*Primary Examiner*—W. Chris Kim
*Attorney, Agent, or Firm*—Jacobson, Price, Holman & Stern, PLLC

[57] ABSTRACT

An apparatus processes an analog audio signal having been stored in a recording medium in a recording order and being reproduced therefrom in a reverse order of the recording order and at a speed $\alpha$ ($\alpha \geq 1$) times higher than a recording speed to the recording medium. The analog signal is converted to digital audio signals and written in a memory having head and final addresses. The digital audio signals read from the memory are converted to an output analog audio signal. A controller controlling writing and reading the digital audio signals to and from the memory has a read address controller for controlling read addresses of the memory such that the read addresses repeatedly reciprocate between the head and final addresses. The controller controls the writing such that, if $\alpha>1$, the writing starts in sequence from the head or final address when the read address reaches in the vicinity of an address which advances by $(\alpha-1)/\alpha$ of all the addresses after returned at the head or final address, whereas if $\alpha=1$ the writing starts in sequence from the head or final address immediately after the read address returning at the head or final address.

3 Claims, 14 Drawing Sheets

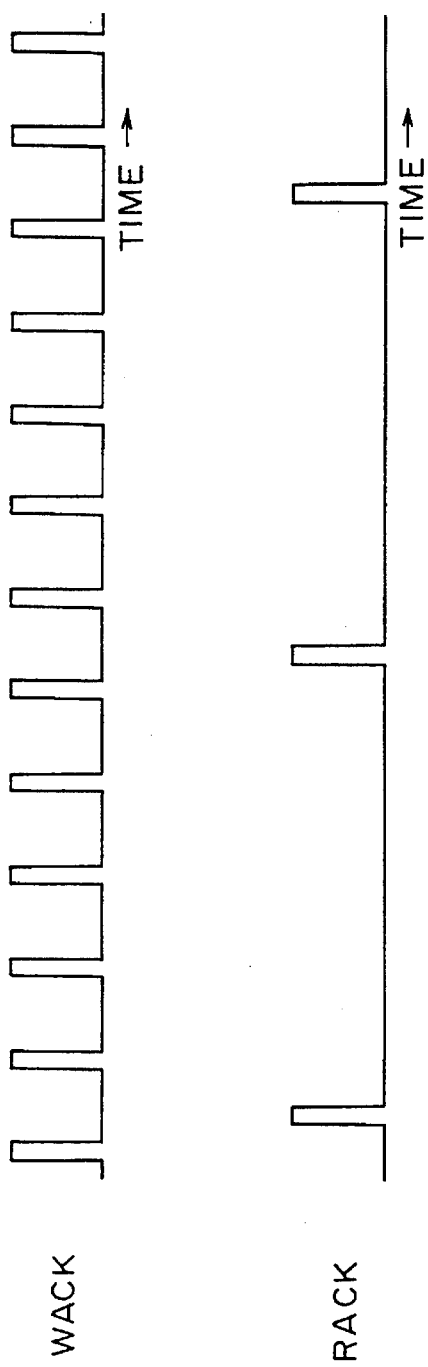
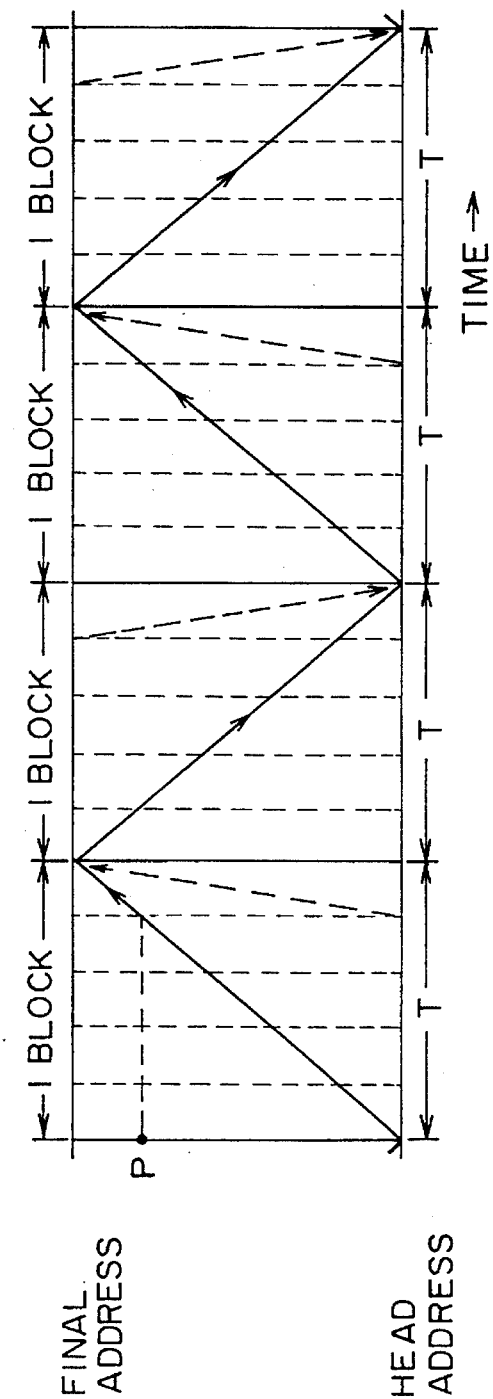
FIG. 3A  WACK
FIG. 3B  RACK
FIG. 4

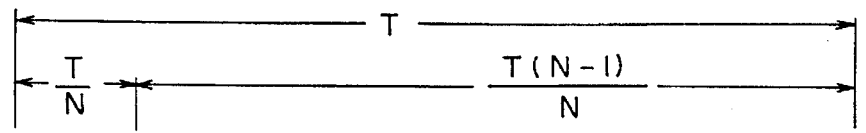
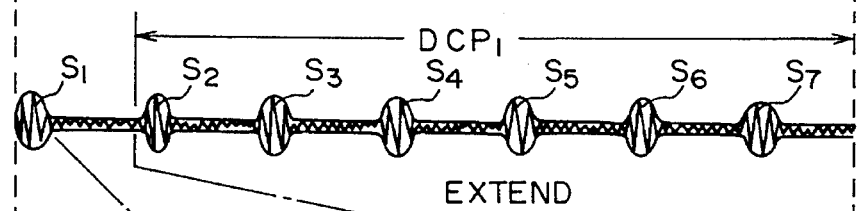
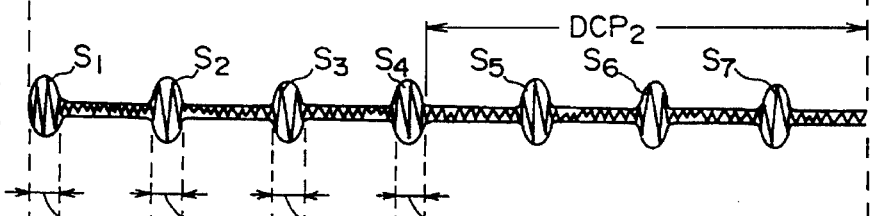
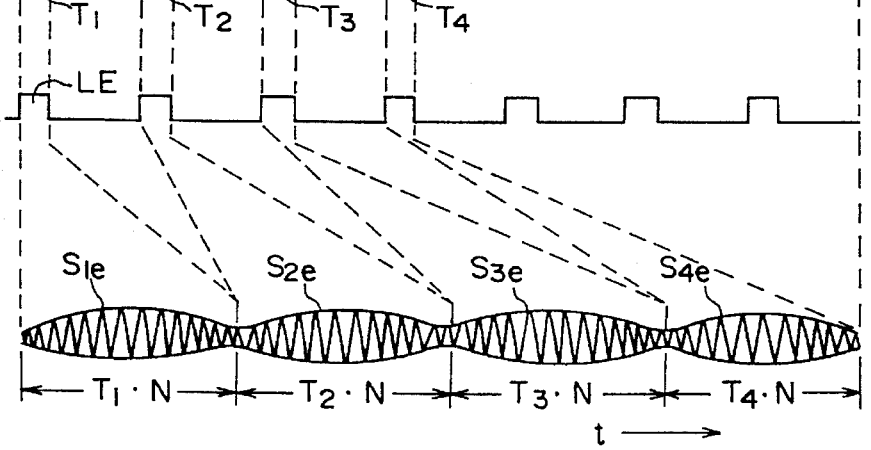

1

AUDIO SIGNAL PROCESSING APPARATUS FOR HIGH SPEED OR FORWARD/REVERSE DIRECTION REPRODUCTION

BACKGROUND OF THE INVENTION

1. Field of the Invention

The present invention relates to an audio signal processing apparatus for reproducing audio signals recorded on a recording medium, and more specifically to an audio signal processing apparatus for reproducing audible audio signals, in particular in high speed or forward/reverse direction reproduction mode.

2. Description of the Related Art

When video signals are reproduced by a VTR, pictures can be reproduced in various reproduction modes such as ordinary picture, still picture, quick-motion picture, slow-motion picture, reverse direction picture, etc. In the respective picture reproduction modes, information recorded on a magnetic tape can be reproduced by driving the magnetic tape in a direction the same as or opposite to the travel direction of the magnetic tape driven in the recording operation or at a speed the same as or different from the travel speed of the magnetic tape driven in the recording operation.

In the VTR, further, audio signals can be recorded on and reproduced from a magnetic tape, in addition to video signals. Therefore, when audio signals recorded on the magnetic tape together with video signals are reproduced in a direction and at a travel speed different from those of the magnetic tape driven in the recording operation, the audio signals are to be reproduced under such conditions that the audio signal pitch (the fundamental frequency of sound) differs from the original audio signal pitch and/or the information arrangement on a time axis is reversed to the original information arrangement.

As a result, for instance when the recorded information is reproduced from a magnetic tape in a high speed reproduction mode to confirm the contents of the reproduced picture at high speed, the frequency of the audio signals recorded together with the reproduced video signals are converted to a higher pitch (higher sound fundamental frequency) as a matter of course. Therefore, even if the recorded audio signals are reproduced, it is difficult to understand the contents of the information. Further, when the audio signals are reproduced at high speed and in addition in the reverse direction, since the frequency of the audio signals recorded together with the video signals are converted into the higher pitch and in addition the information arrangement is reversed on the time axis, it is still more difficult to understand the contents of the information.

However, when audio signals are being reproduced by driving the magnetic tape (on which video and audio signals are both recorded) at high speed, if the information contents of the audio signals can be understood clearly together with the reproduced video signals, it is possible to use the VTR in much wider fields. For this purpose, there has been proposed such a video and audio reproducing apparatus provided with such signal processing means that the sound pitch can be converted so that the audio signals reproduced at a high speed and/or in a reverse direction can be restored to the original audio signals. In this apparatus, the audio signals compressed on the time axis in the high speed reproduction mode are divided into a plurality of signal blocks for each predetermined amount of audio information; the signal for each block is sampled at a short sampling period; the sampled digital signals are quantized; the quantized digital signals are stored in a memory; and the digital signals stored in the memory are read from the memory for each block at a long-period reading clock timing so that the read digital signals can be extended on the time axis and thereby restored to the original audio signals.

SUMMARY OF THE INVENTION

The object of the present invention is to provide an audio signal processing apparatus, by which one block time length (during which a predetermined amount of audio information is included) can be always kept constant even if the reproducing speeds are switched in the reverse reproduction mode.

Another object of the present invention is to provide an audio signal processing apparatus, by which an automatic gain control (AGC) can be executed at high response speed when the level of the input signals is excessively high, but at low response speed when the level of the input signals is lowered gradually.

Still another object of the present invention is to provide an audio signal processing apparatus, by which only the inputted high-level audio signal including only sufficient information can be reproduced.

Further, the other object of the present invention is to provide an audio signal processing apparatus, by which one block time length (during which a predetermined amount of audio information is included) can be always kept constant without causing any pitch offset, even if the reproducing speeds are switched in the forward reproduction mode.

The present invention provides an audio signal processing apparatus having first conversion means for converting a first analog audio signal to digital audio signals, the first analog audio signal having been stored in a recording medium in a predetermined recording order and being reproduced therefrom in a reverse order of the recording order and at a speed $\alpha$ ($\alpha \geq 1$) times higher than a recording speed to the recording medium; a memory that stores the digital audio signals into addresses having predetermined head and final addresses; control means for controlling writing and reading the digital audio signals to and from the memory; and second conversion means for converting the digital audio signals read from the memory to a second analog audio signal which is to be an output of the audio signal processing apparatus. The control means has read address control means for controlling read addresses of the memory from which the stored digital audio signals are read out such that the read addresses repeatedly reciprocate between the head and final addresses, wherein, the control means controls the writing such that, if $\alpha>1$, the writing starts in sequence from the head or final address when the read address reaches in the vicinity of an address which advances by $(\alpha-1)/\alpha$ of all the addresses having returned at the head or final address, whereas if $\alpha=1$, the writing starts in sequence from the head or final address immediately after the read address returning at the head or final address.

The present invention further provides audio signal processing apparatus has first conversion means for converting a first analog audio signal to digital audio signals, the first analog audio signal having been stored in a recording medium in a predetermined recording order and being reproduced therefrom in the same order as the recording order and at a speed $\alpha$ ($\alpha>1$) times higher than a recording speed to the recording medium; a memory that stores the digital audio signals into addresses having predetermined head and final addresses; control means for controlling writing and reading the digital audio signals to and from the memory; and second conversion means for converting the digital audio signals read from the memory to a second analog audio signal which is to be an output of the audio signal processing apparatus. The control means has read address control means for controlling read addresses of the memory from which the stored digital audio signals are read out such that the read addresses repeatedly reciprocate between the head and final addresses, wherein, the control means controls the writing such that, if $\alpha>1$, the writing starts in sequence from the head or final address when the read address reaches in the vicinity of the head or final address returning at the head or final address.

In the above two apparatuses, the address control means may have a read address counter that counts up the read address beginning from the head address and generates a final address signal when the read address becomes the final address, and counts down the read address beginning from the final address and generates a head address signal when the read address becomes the head address, the counter starting the count-up operation when generating the head address signal, whereas starting the count-down operation when generating the final address signal; and the control means may further have generating means for generating a predetermined write start address in response to the head or final address signal; a comparator that compares the write start address and the read address counted by the counter; and a write address counter that repeatedly counts up and down a write address beginning from the head and final address in response to the comparison result.

The present invention further provides an audio signal processing apparatus having first conversion means for converting an input analog audio signal to digital audio signals; a memory that stores the digital audio signals; control means for controlling writing and reading the digital audio signals to and from the memory; and second conversion means for converting the digital audio signals read from the memory to a second analog audio signal which is to be an output of the audio signal processing apparatus. The audio signal processing apparatus further has gain control means for adjusting gain of the input audio signal and applying the gain-adjusted analog audio signal to the first conversion means; and control means for controlling the gain adjustment of the gain control means such that, when levels of the digital audio signals reaches a predetermined maximum or minimum level, the gain-adjusted analog audio signal is made smaller by a first predetermined amount, whereas when the levels of the digital audio signals are between the maximum and minimum levels, the gain-adjusted analog audio signal is made larger by a second predetermined amount.

In the above apparatus, the control means may have a generator that generates pulse signals in response to the digital audio signals outputted from the first conversion means; an up/down counter that counts the pulse signals to generate gain control data of predetermined number of bits; count stop means for stopping the count-up operation of the up/down counter when the gain control data becomes larger than a predetermined fourth amount, whereas stopping the count-down operation of the up/down counter when the gain control data becomes smaller than a predetermined fifth amount. Furthermore, the gain control means may have a plurality of switches which are turned on or off in response to high or low levels of the bits of the gain control data; and a plurality of resistors connected to each other so as to construct a ladder circuit to which the gain control data is applied, wherein, the application of the gain control data to the ladder circuit causes a plurality of voltage drops which are applied to the input analog audio signal to control the gain of the input analog audio signal.

The present invention further provides an audio signal processing apparatus having first conversion means for converting an input analog audio signal having signal portions of different levels to digital audio signals, the input analog audio signal having been reproduced from a recording medium within a period T/N (N being 2 or more integer) shorter than a recording time T under a condition that time-axis of the input analog audio signal is compressed by 1/N; a memory that stores the digital audio signals; control means for controlling writing and reading the digital audio signals to and from the memory; and second conversion means for converting the digital audio signals read from the memory to an N-time extended second analog audio signal which is to be an output of the audio signal processing apparatus. The control means has comparing means for comparing the levels of the signal portions of the input analog audio signal with a reference level; writing means for successively writing the signal portions whose levels are detected to be higher than the reference level to the memory; detecting means for detecting an address number of the memory in which the signal portion stored is not readout yet and making the writing means write a succeeding signal portion in the memory when the address number becomes a predetermined number.

In the above apparatus, the comparing may have a rectifier that rectifies half-waves of the input analog audio signal portions; a low-pass filter that makes half-wave rectified analog audio signal portions of a predetermined level pass therethrough; and a comparator that compares the output signal portions of the rectifier and the low-pass filter to each other and makes pass therethrough output signal portions of the rectifier which are larger than output signal portions of the low-pass filter. Furthermore, in the apparatus, the comparing means may have a rectifier that rectifies half-waves of the input analog audio signal portions; a first low-pass filter having a first time constant that makes half-wave rectified analog audio signal portions of a first predetermined level pass therethrough; a second low-pass filter having a second time constant longer than the first time constant that makes half-wave rectified analog audio signal portions of a second predetermined level pass therethrough; and a comparator that compares the output signal portions of the first and second low-pass filters to each other and makes pass therethrough output signal portions of the first low-pass filter which are larger than output signal portions of the low-pass filer.

The present invention further provides an audio signal processing apparatus having first conversion means for converting an input analog audio signal that is reproduced from a recording medium with an integer ratio of a reproducing speed to a recording speed, the ratio being selected from a plurality of integer ratios, the recording speed being a relative linear speed between the recording medium and a recording element and the reproducing speed being a relative linear speed between the recording medium and a reproducing element; a memory that stores the digital audio signals; control means for controlling writing and reading the digital audio signals to and from the memory; and second conversion means for converting the digital audio signals read from the memory to a second analog audio signal which is to be an output of the audio signal processing apparatus. The control means has a first generator that generates a clock signal which is determined by multiplying a constant signal by a numerical number which is obtained by multiplying a natural number by the least common multiple of the plurality of integer ratios; and a second generator that, being applied the clock signal, generates control signals for controlling the writing and reading corresponding to the selected integer ratio of the reproducing speed to the recording speed.

BRIEF DESCRIPTION OF THE DRAWINGS

FIGS. 3A and 3B are views for assistance in explaining the relationship between a write address clock and a read address clock, respectively;

FIG. 4 is a similar view for assistance in explaining the operation of the audio signal processing apparatus shown in FIG. 2;

FIGS. 13A to 13G are views for assistance in explaining the operation of the audio signal processing apparatus shown in FIG. 11;

DETAILED DESCRIPTION OF THE EMBODIMENTS

The embodiments of the audio signal processing apparatus according to the present invention will be described hereinbelow with reference to the attached drawings.

Figure 1:
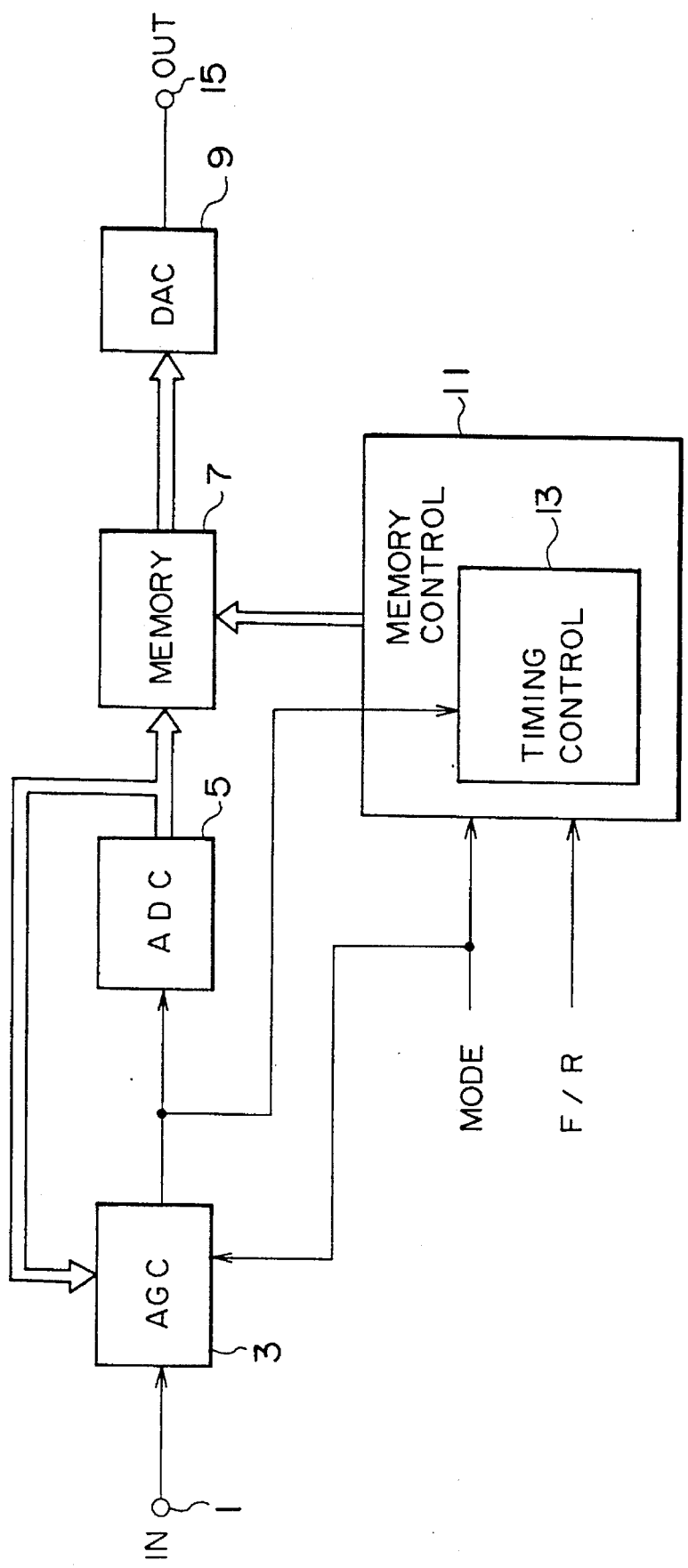
FIG. 1 is a schematic block diagram showing the basic configuration of the audio signal processing apparatus according to the present invention.

FIG. 1 shows a basic construction of the audio signal processing apparatus according to the present invention.

In FIG. 1, an audio signal is applied to an automatic gain control circuit 3 through an input terminal 1 to adjust the gain of the audio signal. The audio signal whose gain is adjusted is then applied to an A-D converter 5 to convert the inputted analog audio signal to digital audio signals. The digital audio signals are fed back to the automatic gain control circuit 3 and written in a memory 7, and then read from the memory 7. The read digital audio signals are given to a D-A converter 9 to convert the digital audio signals to an analog audio signal. The analog audio signal is then outputted through an output terminal 15.

Further, the digital audio signals are written in and read from the memory 7 under control of a memory control circuit 11 including a timing control circuit 13. In response to a reproduction speed mode signal MODE and a reproduction direction mode signal F/R, both applied by a recording and reproducing apparatus (not shown), the memory control circuit 11 controls the read/write timings of the memory 7 so that the time-axis compressed or the reproduction-direction reversed reproduced digital audio signals can be restored to the original digital audio signals.

In FIG. 1, the reproduction speed mode signal MODE is further applied to the automatic gain control circuit 3 and this will be explained with reference to FIG. 7. Further, in FIG. 1 the audio signal whose gain is adjusted is further applied to the timing control circuit 13 and this will be explained with reference to FIG. 11.

Figure 2:
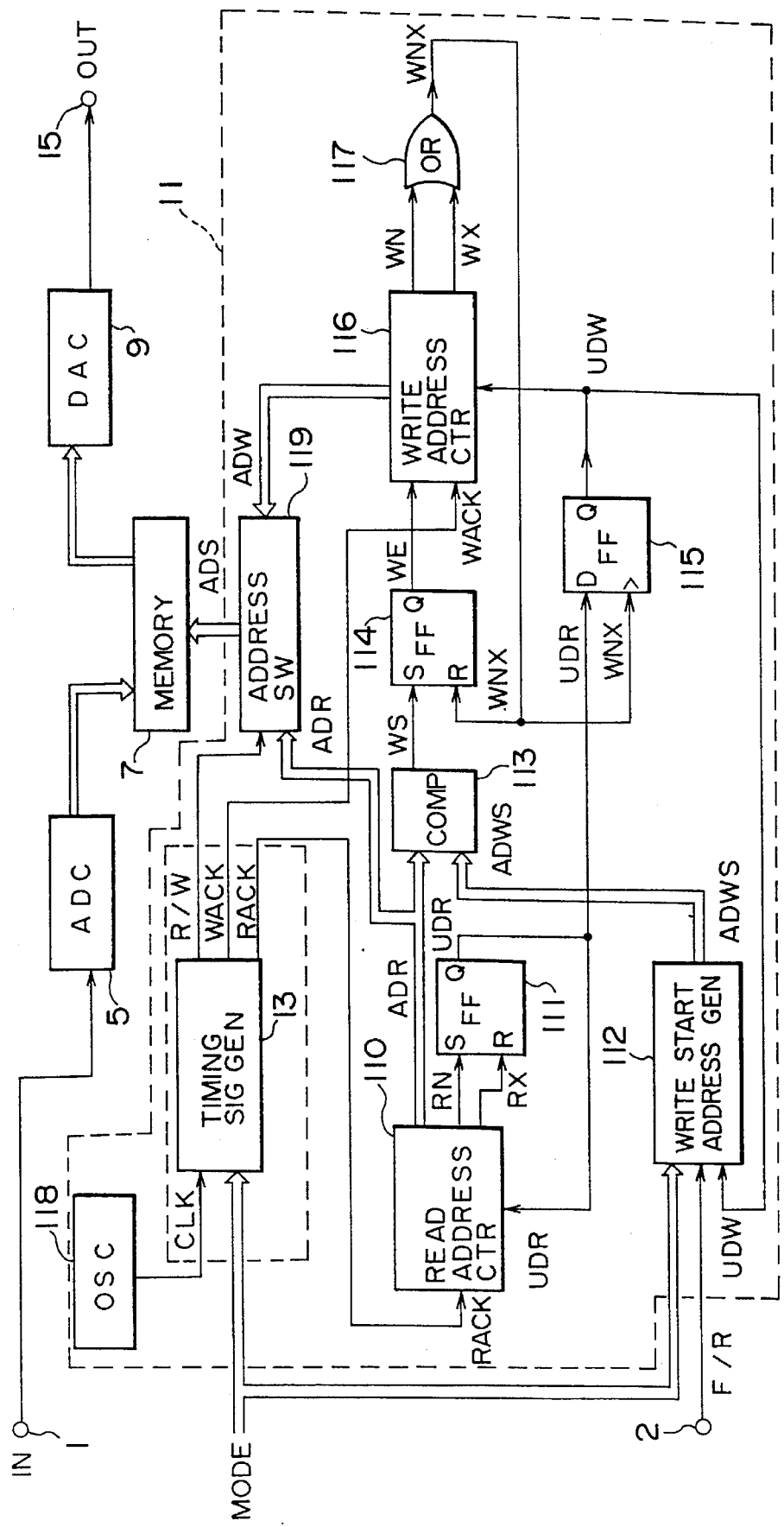
FIG. 2 is a block diagram showing a first embodiment of the audio signal processing apparatus according to the present invention.

FIG. 2 shows a first embodiment of the audio signal processing apparatus according to the present invention, in which an area enclosed by dashed lines corresponds to the memory control circuit 11 shown in FIG. 1.

In FIG. 2, an audio signal is reproduced from a magnetic tape by a recording and reproducing apparatus, and then applied to the input terminal 1. In this case, when the audio signal is reproduced by the recording and reproducing apparatus (e.g., VTR) (not shown) at a multiple-time speed in the forward or reverse direction, since the audio signal is reproduced being compressed on the time axis, a time-axis compressed audio signal is applied to the input terminal 1 under the condition that audio signal frequency is converted to a higher pitch (a higher sound fundamental frequency).

The time-axis compressed audio signal is then given to the A-D converter 5, after the gain of the audio signal is adjusted (a gain control circuit is not shown.). In the A-D converter 5, the analog audio signal is converted to digital signals each composed of predetermined bits for each predetermined sampling period, on the basis of an A-D conversion pulse supplied from a controller (not shown). The digital audio signals outputted by the A-D converter 5 are stored in the memory 7. In this write operation of the memory 7, since a write address signal ADW generated by a write address counter 116 is applied to the memory 7 via an address switch 119, the digital audio signals outputted by the A-D converter 5 are written in address areas designated by the write address signal ADW.

The digital time-axis compressed audio signals written in the memory 7 are read in such a way that the original digital audio signals of a predetermined pitch can be obtained by extending the time-axis compressed audio signals on the time axis, and then applied to the D-A converter 9. After having been converted to the original analog audio signal by the D-A converter 9, the original analog audio signal is outputted through the output terminal 15.

In FIG. 2, an oscillator 118 generates a reference clock signal CLK, and the generated clock signal CLK is applied to a timing signal generator 13. The timing signal generator 13 generates various signals corresponding to the reproduction modes of the recording and reproducing apparatus (i.e., write address clock signal WACK, read address clock signal RACK, address mode signal R/W, etc.) on the basis of the clock signal CLK applied by the oscillator 118 and the reproduction speed mode signal MODE applied from the outside.

FIGS. 3A and 3B show the write address clock signal WACK and read address clock RACK, in which the period of the write address clock signal WACK is ⅕ of that of the read address clock signal RACK by way of example. Further, both the write and read address clock signals WACK and RACK are generated being offset in phase from each other on the time axis, as shown.

A reproduction direction mode signal F/R (applied by the recording and reproducing apparatus via a terminal 2), the reproduction speed mode signal MODE, and a write address up/down signal UDW (applied by a D-type flip-flop 115 are applied to a write start address generator 112. Therefore, the write start address generator 112 generates a write start address ADWS on the basis of the above-mentioned various signals. The write start address ADWS actually indicates a read address for reading operation from the memory 7 at which writing operation to the memory 7 must be started (This will be described later.). The generated write start address ADWS is applied to a comparator 113.

The read address clock signal RACK is also generated by the timing signal generator 13, and applied to a read address counter 110 as a count signal. Therefore, the read address counter 110 adds or subtracts the read address clock signal RACK according to a read up/down signal UDR, and outputs a read address signal ADR to the comparator 113 and simultaneously to an address switch 119. In the subtraction operation, the read address counter 110 outputs a read address minimum signal RN at such timing that the read address signal ADR reaches the head address for each signal block. In the addition operation, the read address counter 110 outputs a read address maximum signal RX at such timing that the read address signal ADR reaches the final address for each signal block.

The read address minimum signal RN outputted by the read address counter 110 is applied to a set terminal of a set-reset flip-flop 111, and the read address maximum signal RX outputted by the read address counter 110 is applied to a reset terminal of the set-reset flip-flop 111. Therefore, in the subtraction operation of the read address counter 110, a high-level read up/down signal UDR is outputted from a Q output terminal of the set-reset flip-flop 111 at such a timing that the read address signal ADR reaches the head address for each signal block. On the other hand, in the addition operation of the read address counter 110, a low-level read up/down signal UDR is outputted from the Q output terminal of the set-reset flip-flop 111 at such a timing that the read address signal ADR reaches the final address for each signal block. The read up/down signal UDR outputted from the Q output terminal of the set-reset flip-flop 111 is applied to the read address counter 110 to switch the operation from addition to subtraction, and vice versa, and simultaneously to a D terminal of the D-type flip-flop 115.

The write address clock signal WACK generated by the timing signal generator 13 is applied to a write address counter 116 as a count signal. Therefore, the write address counter 116 adds or subtracts the write address clock signal WACK according to the write up/down signal UDW outputted from the Q output terminal of the D-type flip-flop 115, and outputs a write address signal ADW to the address switch 119. In the subtraction operation, the write address counter 116 outputs a write address minimum signal WN at such a timing that the write address signal ADW reaches the head address for each signal block. In the addition operation, the write address counter 116 outputs a write address maximum signal WX at such a timing that the write address signal ADW reaches the final address for each signal block.

The write address minimum signal WN and the write address maximum signal WX outputted by the write address counter 116 are applied to an OR circuit 117. Therefore, the OR circuit 117 outputs a logical sum output signal WNX of both the address minimum and maximum signals WN and WX. This signal WNX is applied to a reset terminal of the set-reset flip-flop 114 and simultaneously to a clock terminal of the D-type flip-flop 115. Further, the output signal WS of the comparator 113 is applied to the set terminal of the set-reset flip-flop 114.

Therefore, a high-level write enable signal WE is outputted from the Q output terminal of the set-reset flip-flop 114 from when the signal WS outputted by the comparator 113 is inputted to the set terminal thereof to when the signal WNX outputted by the OR circuit 117 is inputted to the reset terminal thereof. The outputted write enable signal WE is applied to the write address counter 116. Therefore, the write address counter 116 counts the write address clock signal WACK only when the write enable signal WE is at the high level.

The read up/down signal UDR is outputted from the Q output terminal of the set-reset flip-flop 111 to the data terminal of the D-type flip-flop 115. Therefore, the write address up/down signal UDW generated by the D-type flip-flop 115 is applied from the Q output terminal thereof to the write address counter 116 and the write start address generator 112 at such a timing that the output signal WNX of the OR circuit 117 is applied to the clock terminal of the D-type flip-flop 115.

The read address signal ADR outputted by the read address counter 110, the write address signal ADW outputted by the write address counter 116, and the address mode signal R/W outputted by the timing signal generator 13 are applied to an address switch (address selection circuit) 119. The address switch 119 switches the read address signal ADR (outputted by the read address counter 110) to the write address signal ADW (outputted by the write address counter 116) or vice versa in accordance with the address mode signal R/W, and outputs an address signal ADS to the memory 7.

The write and read operation to and from the memory 7 is executed at the memory areas designated by the write address signal ADW and the read address signal ADR both given to the memory 7 via the address switch 119 as the address signal ADS.

Figure 5:
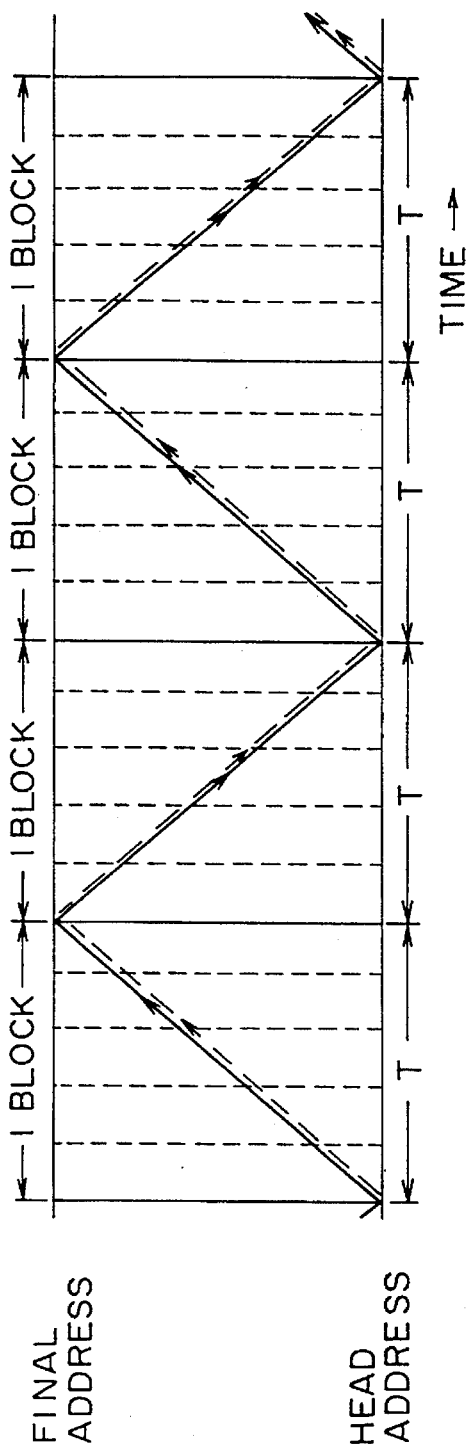
FIG. 5 is a similar view for assistance in explaining the operation of the audio signal processing apparatus shown in FIG. 2.
Figure 6:
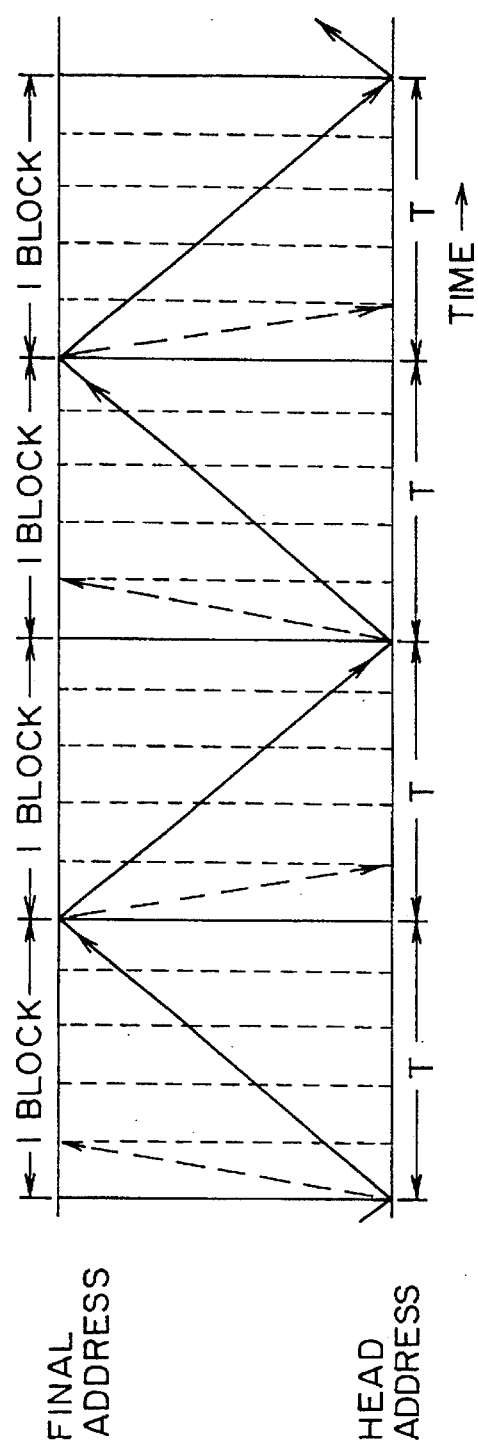
FIG. 6 is a similar view for assistance in explaining the operation of the audio signal processing apparatus shown in FIG. 2.

FIGS. 4 to 6 show the relationship between the write operation and the read operation along the time axis in the memory 7 of the audio signal processing apparatus according to the present invention. FIG. 4 shows the case where the audio signal is reproduced from the recording medium in the reverse direction at the speed 5 times higher than the ordinary reproduction speed. FIG. 5 shows the case where the audio signal is reproduced from the recording medium in the reverse direction at the ordinary reproduction speed. FIG. 6 shows the case where the audio signal is reproduced from the recording medium in the forward direction at the speed 5 times higher than the ordinary reproduction speed. These drawings show the relationship between the write and read operation to and from the memory 7 of the audio signal processing apparatus, respectively, in each of which the write operation to the memory 7 is shown by dashed lines and the read operation from the memory 7 is shown by solid lines, respectively. Further, in these drawings, the horizontal axis indicates a time axis T within each signal block including a predetermined amount of audio information (the number of digital signals), and the vertical axis indicates addresses of the memory 7 beginning from a predetermined head address (the lower side) to a predetermined final address (the upper side) for each signal block.

As understood by the continuous broken (oblique) solid lines in FIGS. 4 to 6, in the audio signal processing apparatus according to the present invention shown in FIG. 2, the read addresses (solid lines) in the memory 7 are changed such that the read addresses repeatedly reciprocate between the predetermined head and final addresses within one block of a predetermined amount of audio information. In more detail, when read from the memory 7, digital audio signals are read beginning from the head address to the final address of one block of a time length T, and after that beginning from the final address to the head address of the succeeding block of the succeeding time length T, and so on, as shown in FIGS. 4 to 6.

On the other hand, the write addresses (dashed lines) to the memory 7 are controlled as follows:

As shown in FIG. 4, in the case where the audio signal is reproduced in the reverse direction at a reproduction speed (the relative speed between the recorded medium and the reproducing element in the reproduction operation) $\alpha$ ($\alpha$>1) times higher than the recording speed (the relative speed between the recording medium and the recording element in the recording operation), the write operation starts in sequence from the predetermined head or final address when the read address reaches in the vicinity of the address P (shown in FIG. 4) that advances by ($\alpha$−1) / $\alpha$ of all the addresses within one block (T) after having returned at the head or final address of the memory 7. The read address in the vicinity of the address P may be larger than or smaller than the address P and is generated by the write start address generator 112 of FIG. 2 as the write start address ADWS.

In other words, when written in the memory 7, digital audio signals are written beginning from the head address to the final address of one block within a short time T/$\alpha$, and after that beginning from the final address to the head address of the succeeding block in the same short time T/$\alpha$, and so on.

As shown in FIG. 5, in the case where the audio signal is reproduced in the reverse direction at a reproduction speed the same as that the recording operation ($\alpha$=1), the write operation starts in sequence from the predetermined head or final address immediately after the read address having returned at the head or final address of the memory 7 for each block, and so on.

As shown in FIG. 6, in the case where the audio signal is reproduced in the forward direction at a reproduction speed $\alpha$ ($\alpha$>1) times higher than the recording speed, the write operation starts in sequence from the predetermined head or final address when the read address reaches in the vicinity of the head or the final address (i.e., when returned at the head or final address of the memory 7 of one block). In other words, when written in the memory 7, digital audio signals are written beginning from the head address to the final address of one block within a short time T/$\alpha$, and after that beginning from the final address to the head address of the succeeding block in the same short time T/$\alpha$, and so on.

As described above, in the first embodiment of the present invention, even when the audio signal is reproduced in the reverse direction and further when the reproduction speed is multiplied, since the continuous reproduction time blocks (i.e., a series of signal blocks) are always kept in T sec length, it is possible to reproduce the audio signal audibly and continuously. In addition, when the audio signal is reproduced in the forward direction, since it is possible to use the same read address controlling means as with the case of the audio signal processing for the reverse direction reproduction, the circuit construction can be simplified.

Figure 7:
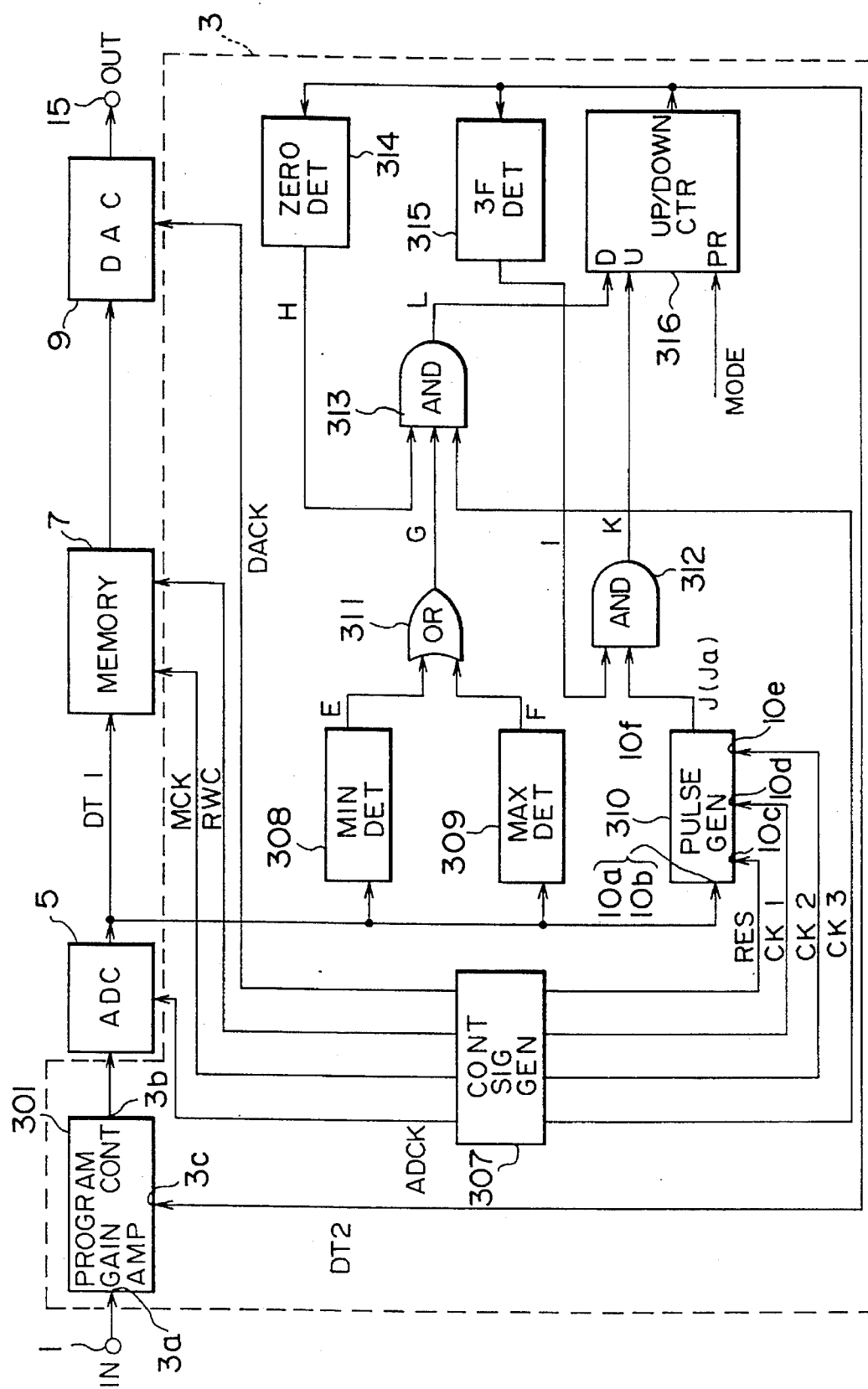
FIG. 7 is a block diagram showing a second embodiment of the audio signal processing apparatus according to the present invention.

FIG. 7 shows a second embodiment of the audio signal processing apparatus according to the present invention, in which the area enclosed by dashed lines corresponds to the gain adjusting circuit 3 shown in FIG. 1.

In FIG. 7, the gain control circuit 3 of the present invention is provided with a programmable gain control amplifier 301. This programmable gain control amplifier 301 controls the gain of an alternating signal inputted through an input terminal 1 and to be processed by the signal processing apparatus on the basis of gain control data DT2 applied thereto, and outputs the inputted alternating signal whose signal level has been controlled to the A-D converter 5.

Figure 8:
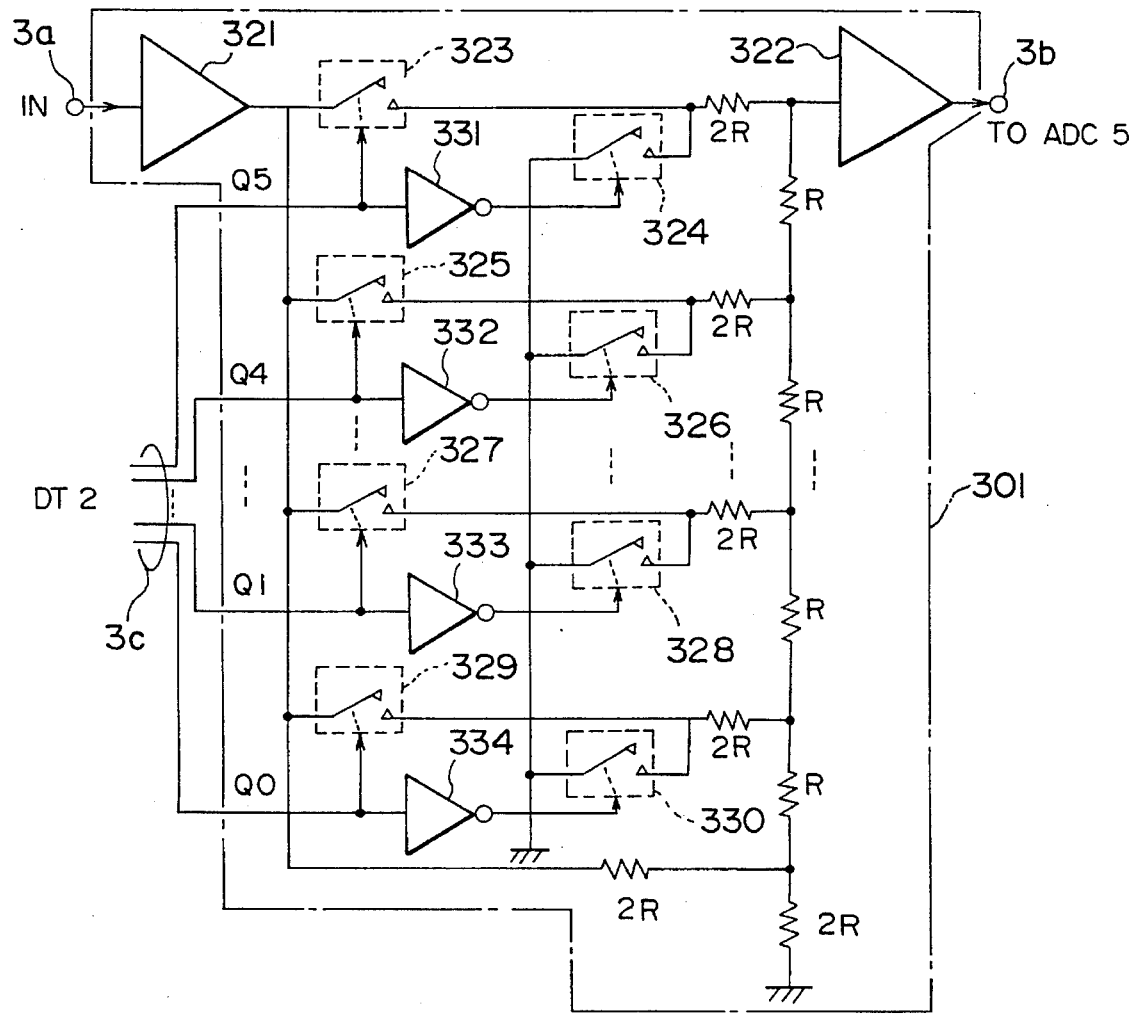
FIG. 8 is a block diagram showing a programmable gain control amplifier of the circuit shown in FIG. 7.

FIG. 8 shows the programmable gain control amplifier 301 in more detail. In FIG. 8, an alternating signal whose gain is to be controlled is inputted through an input terminal 3a, and then given to movable contacts of switches 323, 325, . . . , 327, and 329 via a buffer amplifier 321. To each movable contract of these switches 323, 325, . . . , 327, and 329, 6-bit gain control data DT2 (Q0, Q1, . . . , Q5) are applied through an input terminal 3c, respectively as an open/close control signal. Therefore, these switches are turned on or off on the basis of whether specific bits of the gain control data DT2 are at a high level or a low level. Further, other switches 324, 326, . . . , 328, and 330 are arranged. To each movable contact of these switches 324, 326, . . . , 328, and 330, the same 6-bit gain control data DT2 (Q0, Q1, . . . , Q5) are applied through each of inverters 331, 332, . . . , 333 and 334, respectively as an open/close control signal. Therefore, these switches are turned on or off on the basis of whether specific bits of the gain control data DT2 are at a high level or a low level.

Each of fixed contacts of the switches 323, 325, . . . , 327, 329 and the switches 324, 326, . . . , 328, 330 are connected to each predetermined position of a ladder circuit network composed of resistors R (the resistance is R) and resistors 2R (the resistance is 2R). Further, the movable contacts of the switches 324, 326, . . . , 328 and 330 are grounded. As described above, in the programmable gain control amplifier 301 shown in FIG. 8, since the signal attenuation rate can be switched to 64 different values on the basis of the 6-bit gain control data DT2 (Q0, Q1, . . . , Q5) applied through the input terminal 3c, it is possible to control the signal gain into 64 different steps.

With reference to FIG. 7 again, the output signal of the programmable gain control amplifier 301 is converted into digital signals of a predetermined number of bits, and then written in the memory 7 as data DT1 (of 8 bits in the following description). In the A-D converter 5, the AD conversion is executed in response to an AD conversion clock signal ADCK generated by a control signal generator 307. Further, the data DT1 are written in and read from the memory 7 on the basis of a memory clock signal MCK and a read/write switching signal RWC both generated by the control signal generator 307.

The read operation modes of the memory 7 can be changed according to the reproduction modes of the recording and reproducing apparatus. For instance, in the case where the recording and reproducing apparatus is in reproduction operation mode at an N-time higher speed and therefore the audio signal reproduced from the recording medium is compressed on the time axis by 1/N as compared with the original audio signal recorded on the recording medium (i.e., 1/N time-axis compressed audio signal), the audio signals compressed by 1/N on the time axis are stored in the memory 7, and read from the memory 7 as the original audio signals by extending the 1/N time-axis compressed audio signals by N-times on the time axis. The digital audio signals read from the memory 7 are converted to the analog audio signal by the D-A converter 9, and then outputted through an output terminal 15. Here, the D-A converter 9 is operative on the basis of a DA conversion clock DACK applied by the control signal generator 307. In the above-mentioned N-time higher speed reproduction, the period of the DA conversion clock signal DACK applied from the control signal generator 307 to the D-A converter 9 is N-times longer that the AD conversion clock signal ADCK applied from the control signal generator 307 to the A-D converter 5. Further, the period of the clock signal MCK applied from the control signal generator 307 to the memory 7 in the read operation is N-times longer than that of the clock signal MCk applied from the control signal generator 307 to the memory 7 in the write operation.

In the signal processing apparatus provided with the gain controlling means according to the present invention as shown in FIG. 7, the signal level of the alternating signal applied through the input terminal 1 and to be processed by the processing apparatus is adjusted by the programmable gain control amplifier 301, and then applied to the A-D converter 5. Here, the gain of the programmable gain amplifier 301 is controlled on the basis of the gain control data DT2 applied by an up/down counter 316. The gain control data DT2 can be generated by the up/down counter 316 on the basis of the data DT1 outputted by the A-D converter 5 as follows: As already described, since the data DT1 are of 8-bit data, the following description is made on the basis of hexadecimal notation. The data DT1 outputted by the A-D converter 5 are applied to a minimum value detector 308, a maximum value detector 309 and a pulse generator 310 in addition to the memory 7. When detecting the minimum value 0h of the 8-bit data DT1 outputted by the A-D converter 5, the minimum value detector 308 outputs a high-level output E to an OR circuit 311. Further, when detecting the maximum value FFh of the 8-bit data DT1 outputted by the A-D converter 5, the maximum value detector 309 outputs a high-level output F to the OR circuit 311.

The minimum value 0h of the 8-bit data DT1 outputted by the A-D converter 5 represents the minimum value of the A-D converter 5, and the maximum value FFh of the 8-bit data DT1 outputted by the A-D converter 5 represents the maximum value of the A-D converter 5. The values 0h and FFh are a limit conversion value of the 8-bit A-D converter 5. Therefore, when the 8-bit data DT1 indicates the minimum value 0h and the maximum value FFh, it is necessary to lower the signal level of the analog signal inputted to the A-D converter 5.

Accordingly, the OR circuit 311 outputs an output G indicative of that the signal level of the analog signal applied to the A-D converter 5 should be reduced, on the basis of logical sum of both the outputs E and F of the minimum value detector 308 and the maximum value detector 311.

Figure 9:
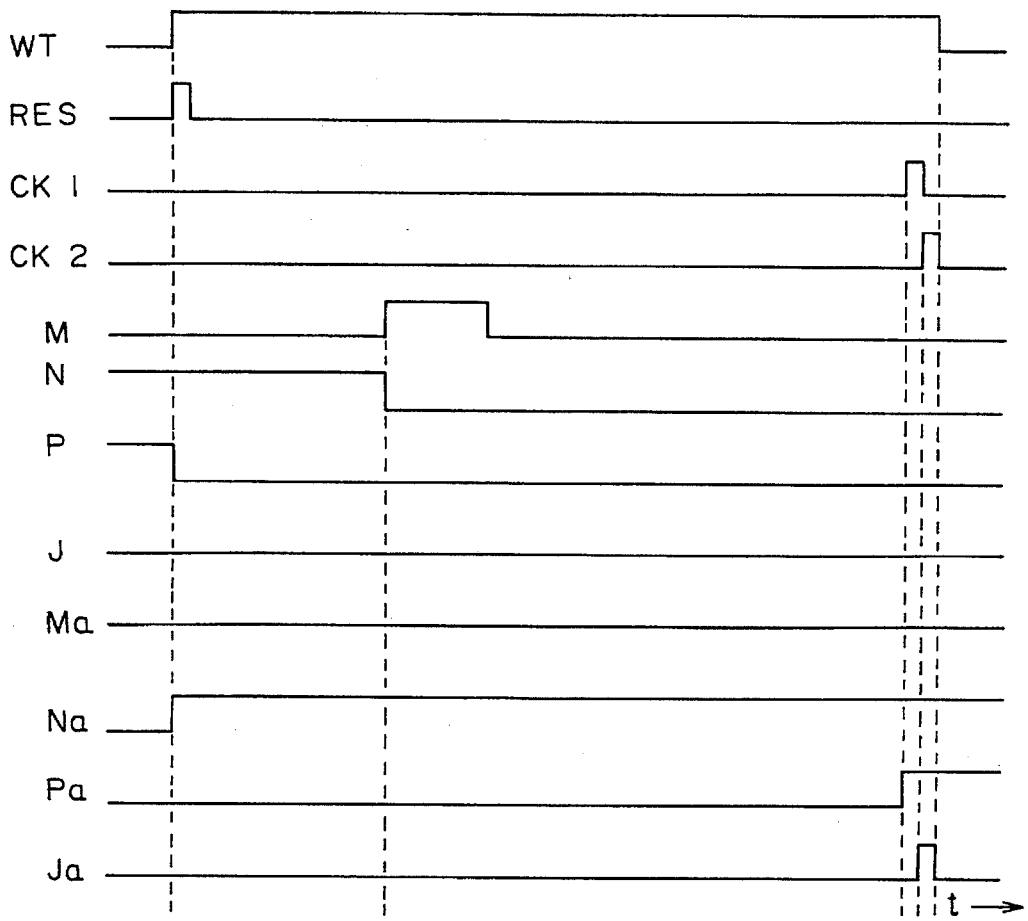
FIG. 9 is a timing chart for assistance in explaining the operation of the audio signal processing apparatus shown in FIG. 7.

The 8-bit data DT1 is applied from the A-D converter 5 to the pulse generator 310. In addition of the 8-bit data DT1, a reset signal RES, a signal CK1 and a signal CK2 (as shown in FIG. 9) are applied from the control signal generator 307 to the pulse generator 310. The pulse generator 310 generates and outputs a signal J(Ja) (as shown in FIG. 9) to an AND circuit 312.

Figure 10:
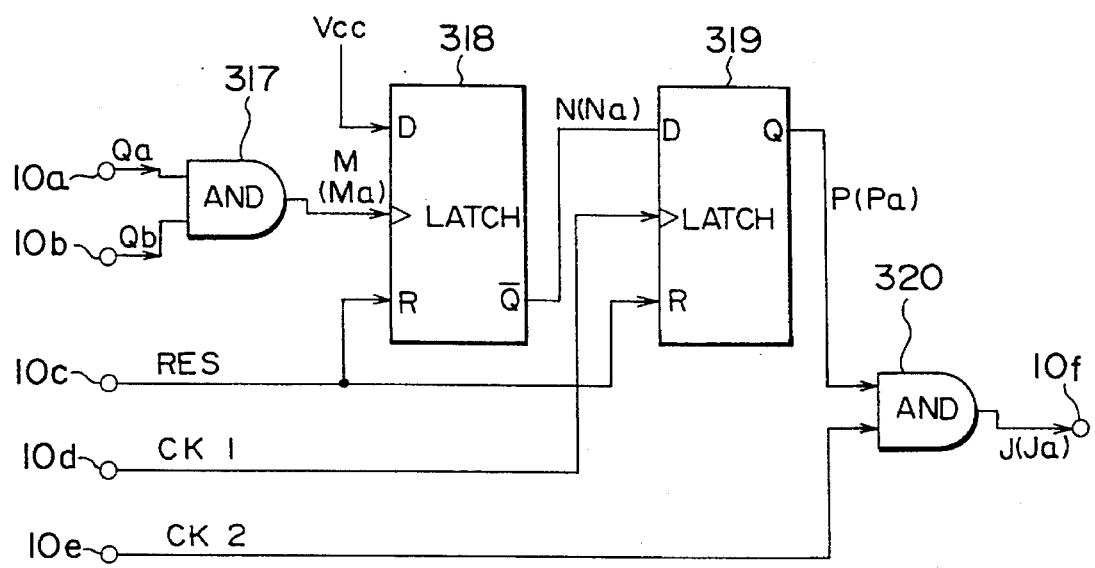
FIG. 10 is a block diagram showing an example of pulse generating circuit of the circuit shown in FIG. 7.

FIG. 10 shows a practical example of the pulse generator 310. To two input terminals 10a and 10b, two more significant bit data (the data Qa of the most significant bit MSb and the data Qb of the second-to-most significant bit) of the 8-bit data DT1 are applied. Further, the reset signal RES is applied to an input terminal 10c; the signal CK1 is applied to an input terminal 10d; and the signal CK2 is applied to an input terminal 10e, respectively. On the other hand, the output J(Ja) is outputted through an output terminal 10f of the pulse generator 310.

In the above-mentioned pulse generator 310, the two more significant bit data Qa and Qb of the output data DT1 of the A-D converter 5 are applied to an AND circuit 317 through the two input terminals 10a and 10b. When both Qa and Qb are at the high level, the AND circuit 317 outputs a high level output M (as shown in FIG. 9) to a clock input terminal of a latch circuit 318. Further, when any one of both Qa and Qb is at the low level, the AND circuit 317 outputs a low level output Ma (as shown in FIG. 9) to the clock input terminal of the latch circuit 318.

The latch circuit 318 is reset in response to the reset signal RES applied to a reset terminal thereof through the input terminal 10c of the pulse generator 310. In addition, since the reset signal RES is also applied to a reset terminal of another latch circuit 319, both the latch circuits 318 and 319 are reset at the same time. Further, a/Q output of the latch circuit 318 is applied to a data input terminal of the latch circuit 319.

The above-mentioned reset signal RES is generated at each start of the sequential signal blocks each set to a predetermined time length of the alternating signal (whose gain is to be controlled). Further, in FIG. 9, this signal block is determined equal to the write period WT. On the basis of this reset signal RES, the/Q output of the latch circuit 318 is set to the high level N(Na), and the Q output of the latch circuit 319 is set to the low level P(Pa), as shown in FIG. 9.

When the output M of the AND circuit 317 is at the high level as shown in FIG. 9; that is, when the two more significant bits Qa and Qb of the output data DT1 of the A-D converter 5 are both at the high level, since this indicates that the output of the A-D converter 5 exceeds C0h, so that this indicates that the lower signal level is suitable (the gain of the inputted alternating signal must be reduced).

As described above, when the output data of the A-D converter 5 exceeds C0h and the lower signal level is suitable, the high-level output M of the AND circuit 317 is applied to the clock terminal of the latch circuit 318. Therefore, the latch circuit 318 latches the Vcc applied to the data terminal thereof, so that the/Q output N thereof changes from the high level to the low level as shown in FIG. 9. This level change can be Generated many times in one signal block of the alternating signal (whose Gain to be controlled).

As shown in FIG. 9, when the low-level/Q output N of the latch circuit 318 is applied to the data terminal of the latch circuit 319, the latch circuit 319 latches the low-level/Q output N of the latch circuit 318 in response to the signal CK1 applied immediately before the signal block (i.e., WT) ends. However, the output (signal P) of the latch circuit 319 is kept at the low level as shown in FIG. 9.

The Q output P of the latch circuit 319 is applied to the AND circuit 320. In addition, the high-level signal CK2 is applied to the AND circuit 320 immediately before the signal block (WT) ends and immediately after the signal CK1 ends, as shown in FIG. 9. Therefore, when the data outputted by the A-D converter 5 exceeds C0h and thereby the lower signal level is suitable, the AND circuit 320 (i.e., the pulse generator 310) outputs a low-level output signal J from the output terminal 10f thereof, as shown in FIG. 9.

When any one of the two more significant bits Qa and Qb of the output data DT1 of the A-D converter 5 is at the low level, since this indicates that the output of the A-D converter 5 does not exceed C0h, so that this indicates that the lower signal level is not suitable. In this case, since the output Ma shown in FIG. 9 of the AND circuit 317 is kept at the low-level, the low-level output Ma of the AND circuit 317 is applied to the clock terminal of the latch circuit 318. In this case, since Vcc applied to the data terminal thereof is not latched, the latch circuit 318 is kept at the high-level/Q output Na as shown in FIG. 9. This high level/Q output Na of the latch circuit 318 is applied to the data terminal D of the latch circuit 319. Therefore, the latch circuit 319 latches the high-level/Q output Na of the latch circuit 318 in response to the signal CK1 applied immediately before the signal block (i.e., WT) ends. Therefore, the output of the latch circuit 319 changed to the high level signal Pa, as shown in FIG. 9.

The high-level Q output Pa of the latch circuit 319 is applied to the AND circuit 320. Therefore, the AND circuit 320 (i.e., the pulse generator 310) outputs a high-level output signal Ja as shown in FIG. 9 from the output terminal 10f thereof, immediately before the signal block (WT) ends and immediately after the signal CK1 ends.

In FIG. 7 again, the output J(Ja) outputted through the output terminal 10f of the pulse generator 310 is applied to the input of the AND circuit 312. On the basis of the output J(Ja) of the pulse generator 310 and the output I of a 3F detector 315, the AND circuit 312 outputs a clock K to the up/down counter 316 to activate it.

The up/down counter 316 can be activated as a down counter in response to a clock L applied by an AND circuit 313 to the up/down counter 316. The output of the AND circuit 313 is outputted as a result of logical product of a signal G outputted by the OR circuit 311, a signal H outputted by a zero detector 314 (described later), and a signal CK3 outputted by the control signal generator 307 one for each sampling period.

The up/down counter 316 outputs the gain control data DT2 to the programmable gain control amplifier 301, the zero detector 314, and the 3F detector 315, respectively. This up/down counter 316 presets 3Fh as a count value when a mode change pulse MCP is applied to the preset terminal thereof by a recording and reproducing apparatus (not shown). Therefore, the gain control operation is executed whenever the reproduction mode changes. Further, whenever the level of the reproduced signal changes due to a change of the reproduction mode, it is possible to always input an alternating signal of appropriate signal level to the A-D converter 5.

The up/down counter 316 executes the count-up operation on the basis of the signal K applied by the AND circuit 312, and the count-down operation on the basis of the signal L applied by the AND circuit 313. The output of the up/down counter 316 is applied to the zero detector 314. This zero detector 314 prevents the count value from being reduced from 0h to 3Fh when the up/down counter 316 is operating as the down counter. That is, when the count value outputted by the up/down counter 316 reaches 0h, the zero detector 314 applies a low-level output H to the AND circuit 313.

Further, the output of the up/down counter 316 is applied to the 3F detector 315. This 3F detector 315 prevents the count value from being increased from 3Fh to 0h when the up/down counter 316 is operating as the up counter. That is, when the count value outputted by the up/down counter 316 reaches 3Fh, the 3F detector 315 applies a low-level output I to the AND circuit 312.

As described above, in the gain control apparatus according to the present invention, the signal level of an alternating signal is first adjusted by the programmable gain control amplifier 301, and then applied to the A-D converter 5. The A-D converted signals DT1 are given to the minimum and maximum detectors 308 and 309. When the A-D converted signals DT1 deviate from both the maximum and minimum values within a predetermined signal length, the up/down counter 316 outputs the gain control data DT2 to the programmable gain control amplifier 301, so that the signal level of the alternating signal can be decreased to an appropriate signal level.

Further, when the A-D converted signals DT1 do not deviate from both the maximum and minimum values within a predetermined signal length, the up/down counter 316 outputs a gain control data DT2 to the programmable gain control amplifier 301, so that the signal level of the alternating signal can be increased to an appropriate signal level gradually.

As described above, in the second embodiment according to the present invention, since the gain of the input signal of an excessive signal level can be adjusted at high response speed, it is possible to prevent the signal distortion (caused when the alternating signal of an excessive signal level is inputted to the A-D converter) in a short time. Further, whenever the reproduction mode is changed, since the signal level can be first set to the maximum value and then adjusted gradually to a lower level at high response speed by the gain control, it is possible to obtain an audio signal easy to hear without producing any rising and falling of tone. Further, since the signal level adjustment is made again whenever the reproduction mode is changed, it is possible to adjust the signal level to an appropriate value at high response speed according to various reproduction speeds. Further, since the control section of the gain control circuit is composed of logical circuits, the circuits can be formed easily by an IC circuit, thus reducing the cost thereof. Further, since the threshold values can be set freely and easily, the operation is stable without any adjustment, so that it is possible to adjust the signal level appropriately and repeatedly, thus realizing a small-sized and low-priced gain control apparatus.

Figure 11:
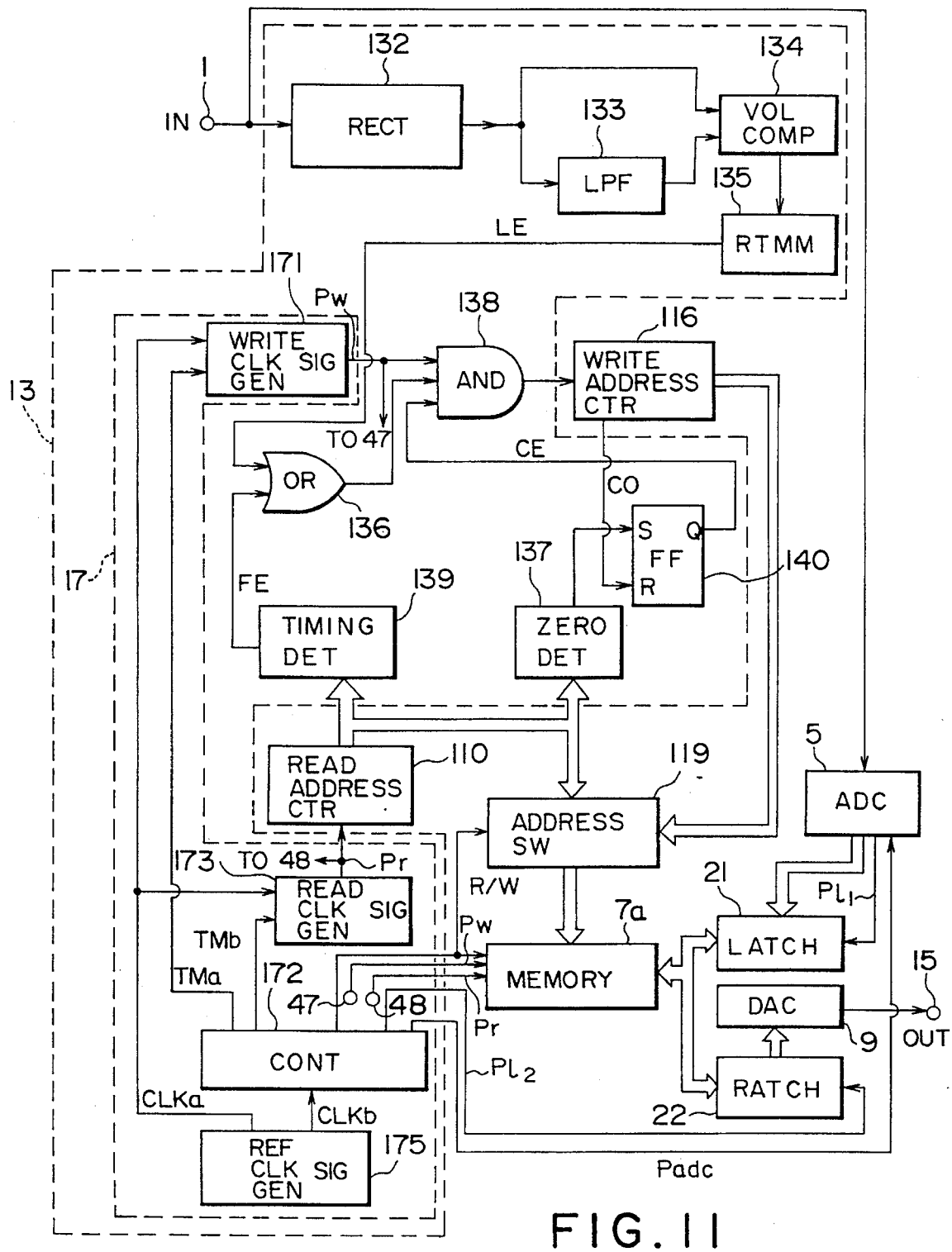
FIG. 11 is a block diagram showing a third embodiment of the audio signal processing apparatus according to the present invention.

FIG. 11 shows a third embodiment of the audio signal processing apparatus according to the present invention, in which the area enclosed by dashed lines corresponds to the timing control circuit 13 shown in FIG. 1. Further, another area enclosed by the dashed lines in FIG. 11 forms a timing signal generating circuit 17.

In FIG. 11, a time-axis compressed audio signal whose gain is controlled by an automatic gain control circuit (not shown) is applied to a rectifier circuit 132 and an A-D converter 5 through an input terminal 1. On the basis of an AD conversion pulse Padc applied by a control circuit 172, the A-D converter 5 converts the time-axis compressed audio signal to digital signals each composed of predetermined bits for each predetermined sampling period and further outputs the converted digital signals to a latch circuit 21.

On the basis of a latch pulse Pl1 applied by the A-D converter 5 for each end of the A-D conversion, the latch circuit 21 stores the digital signals outputted by the A-D converter 5 for each sampling period. The digital signals latched by the latch circuit 21 are given to a memory 7a. The memory 7a writes the given digital signals at addresses designated by write address signals applied by a write address counter 116 via an address switch 119.

Figure 12:
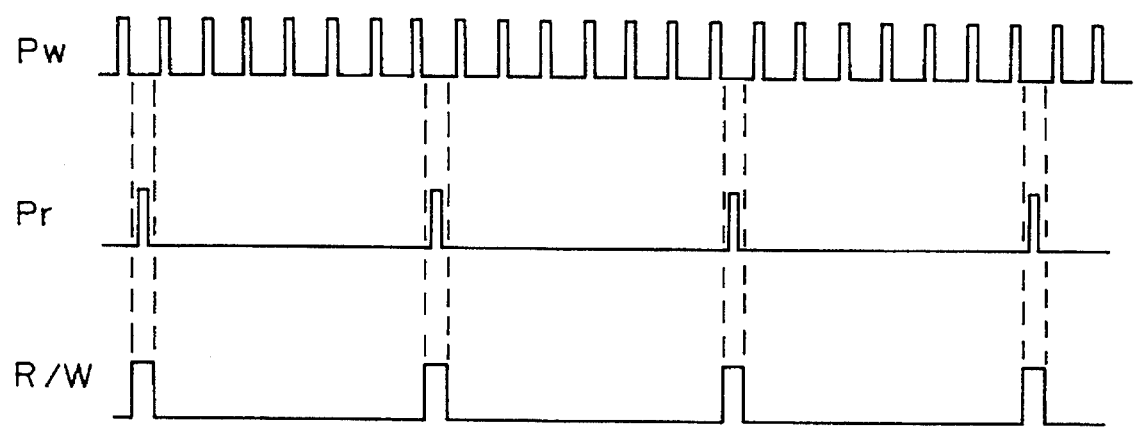
FIG. 12 is a timing chart for assistance in explaining the operation of the audio signal processing apparatus shown in FIG. 11.

The digital signals are written in the memory 7a at such timings that a write clock signal Pw as shown in FIG. 12 is applied from a write clock signal generator 171 to a signal input terminal 47 of the memory 7a. Here, the write clock signal generator 171 generates the write clock signal Pw on the basis of a reference clock signal CLKa applied by a reference clock signal generator 175 and a timing signal TMa applied by a control circuit 172. The generated write clock signal Pw is in synchronism with the A-D conversion pulse Padc.

The digital signals written in the memory 7a are read from the memory (7a) address ADR designated by read addresses applied by a read address counter 110 to the memory 7a via the address switch 119, at such timings that a read clock signal Pr as shown in FIG. 12 generated by a read clock signal generator 173 is applied to the memory 7a via an input terminal 48 of the memory 7a.

The read clock signals Pr rise at time-axis positions different from those of the write clock signal Pw, and the period of the read clock signal Pr is N-times longer than that of the write clock signal Pw. Therefore, although the digital signals written in the memory 7a are the signals whose time-axis is 1/N times compressed (as compared with that of the original audio signal), the digital signals read from the memory 7a are the signals whose time-axis is N-times extended (as compared with that of the written digital signals), that is, the original reproduced audio digital signals.

The digital signals read from the memory 7a are stored in the latch circuit 22 on the basis of a latch pulse Pl2 applied by a control circuit 172. The digital signals latched by the latch circuit 22 are give to a D-A converter 9. The reproduced audio signal D-A converted by the D-A converter 9 is transmitted through an output terminal 15.

Here, when the recording and reproducing apparatus reproduces the recorded signal from a recording medium at a reproduction speed N-time higher than that of the ordinary speed (N-time speed), the time-axis compressed audio signals (whose time axis is compressed by 1/N on the time axis, as compared with the original audio signals) are written in the memory 7a in a time length of T/N, where T denotes one signal block or a predetermined time length. Further, the time-axis compressed audio signals written in the memory in the time length T/N are read from the memory in a time length of T(N–1)/N, as shown in FIG. 13A. In other words, since the 1/N time-axis compressed audio signals are written in the memory 7a in each block of a time length T/N, the memory 7a must have a memory capacity enough to store the time-axis compressed audio signals for T/N sec time length cyclically on the time axis.

Therefore, the digital audio signals are written in or read from the memory 7a at the memory areas cyclically designated by the address signals applied from the write address counter 116 and the read address counter 110 to the memory 7a via the address switch 119 at such timings as determined by the write clock signal Pw and the read clock signal Pr both shown in FIG. 12. In FIG. 12, a read/write signal R/W sets the address switch 119 to the read operation when changed to a high level, but to the write operation when changed to a low level.

In the audio signal processing apparatus as shown in FIG. 11, the digital signals corresponding to the time-axis compressed audio signals of T/N sec time length are written for each predetermined block of time length T on the time axis of the memory 7a. Further, the written digital signals are read under the condition that the time-axis thereof is extended by N-times to obtain the original audio reproduced signals for T sec. Here, however, it should be noted that: the time-axis compressed audio signals stored in a time length of T/N sec are not the time-axis compressed audio signals of T/N sec time length continuing from a predetermined position on the time axis for each time length T, but the time-axis compressed audio signals whose addition in duration time of large amplitude signals becomes a time length of T/N sec on the time axis.

The above-mentioned fact will be described in more practical way hereinbelow with reference to FIGS. 13A to 13G, in which FIGS. 13A to 13D are shown as an example of the conventional way, and FIGS. 13E to 13G are shown as an example of the present invention. Here, the assumption is made that when the recording and reproducing apparatus is reproducing audio signal at N-time speed, that is, the 1/N-time compressed digital audio signals are reproduced from the recording medium; and further the time-axis compressed digital audio signals of a predetermined time length T have large amplitude signal portions intermittently on the time axis. Further, in FIGS. 13A to 13G, the digital audio signals are shown in the from of analog audio signals for brevity.

FIG. 13A shows a conventional way in which when the recording and reproducing apparatus is reproducing audio signal at N-time speed, that is, when the 1/N-time compressed digital audio signals are reproduced from the recording medium, only the time-axis compressed audio signals of time length T/N are written in the memory. Further, FIG. 13B shows the conventional way in which the time-axis compressed audio signals of time length T/N written in the memory are read from the memory as the N-time time-axis extended audio signals for a time length T(N–1)/N.

Here, the time-axis compressed audio signals to be written in the memory in the write period of T/N time length in FIG. 13A are the signals of time length T/N composed of the large amplitude signal portion S1 and the small amplitude signal portion (following S1) as shown in FIG. 13C. However, when the time-axis compressed audio signals of time length T/N are read from the memory under the condition that the time axis thereof is simply extended by N-times, the audio signals of time length T read from the memory are composed of the signal portion S1e and the small amplitude signal portion (following S1e) as shown in FIG. 13D. That is, the large amplitude signal portion S1e is a part of the time-axis compressed audio signals, and the major part of thereof is occupied by the small amplitude portion.

In other words, in the conventional way as shown in FIGS. 13A to 13D, when only the time-axis compressed signals of time length T/N are simply written in the memory, since the written time-axis compressed audio signals of time length T/N include only the low amplitude signals, it is impossible to obtain reproduced audio signals of sufficient information.

In contrast with this, in the audio signal processing apparatus according to the present invention, as shown in FIGS. 13E to 13G, the digital signals written in the memory 7a are the digital signals so time-axis compressed that the addition of the time lengths of the large amplitude signal portions becomes T/N sec. Therefore, when the time-axis compressed audio signals of a predetermined time length T are such that the large amplitude portions S1, S2, S3, and S4 are present intermittently on the time axis and the addition of the time lengths T1, T2, T3, and T4 of these large amplitude portions is equal to the write time T/N of the memory, since only the large amplitude portions S1, S2, S3, and S4 of the audio signals of a predetermined time length T can be extended by N-times on the time axis, the large amplitude signal portions S1e, S2e, S3e, and S4e become the signal portions of time lengths of T1.N, T2.N, T3.N and T4.N, respectively, so that it is possible to obtain the reproduced audio signals of time length T having only the continuous large amplitude portions S1e, S2e, S3e and S4e, respectively.

In comparison with the reproduced audio signals as shown in FIG. 13D (the conventional signals) with those as shown in FIG. 13G (the invention signals), when the same reproduced audio signals are processed as shown in FIGS. 13C and 13E, it is apparent that the audio signals of the present invention as shown in FIG. 13G include many audio information, as compared with the conventional audio signals. The above-mentioned effect can be applied to the case of the reverse reproduction in the same way.

With reference to FIG. 11 again, after having been rectified by a rectifier circuit 132, the time-axis compressed audio signal is given to a low-pass filter 133 and a voltage comparator 134, respectively. Further, an output signal of the low-pass filter 133 is applied to a voltage comparator 134.

Figure 14A:
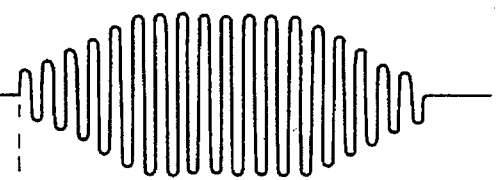
FIGS. 14A to 14D are views for assistance in explaining the operation of the audio signal processing apparatus shown in FIG. 11.
Figure 14B:
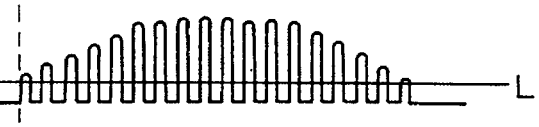

FIG. 14A shows the waveform of the time-axis compressed audio signal applied to the input terminal 1; FIG. 14B shows the waveform of the audio signal half-wave rectified by the rectifier 132; and a reference signal level L—L shown in FIG. 14B shows the waveform of the output signal of the low-pass filter 133 having a sufficiently long time constant.

Figure 14C:

In FIG. 11, the output signal of the low-pass filter 133 is applied to the voltage comparator 134. The voltage comparator 134 compares the output signal of the rectifier 132 (FIG. 14B) with the reference signal level L—L (FIG. 14C)), and outputs a pulse signal string as shown in FIG. 14C when the output of the rectifier 132 is higher than the reference signal level L—L. The outputted pulse signal string is applied to a retriggerable mono-stable multivibrator 135 as continuous trigger pulse signals.

Figure 14D:
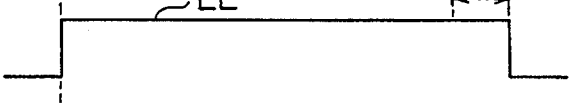

Therefore, as far as a time period of the trigger pulse signals applied to the multivibrator 135 in sequence is within a predetermined time τ of the multivibrator 135, since being triggered repeatedly in sequence, the retriggerable monostable multivibrator 135 is kept generating a signal level enable signal LE as shown in FIG. 14D in response to a trigger signal string as shown in FIG. 14C. This signal level enable signal LE is applied to an AND circuit 138 via an OR circuit 136. The AND circuit 138 outputs a write clock signal Pw to a write address counter 116, when the AND condition of the AND circuit 138 is satisfied by the output of OR circuit 136 (i.e., the signal level enable signal LE or an enable signal FE applied from a timing detector 139), a write clock signal Pw generated by a write clock signal generator 171 and a count enable signal CE applied by a set-reset flip-flop 140.

A set-reset flip-flop 140 is set when the count value of the read address counter 110 reaches zero and thereby a zero detector 137 apples a zero detection signal to the set terminal S of the set-reset flip-flop 140, and reset when a predetermined quantity of signals have been stored in the memory and thereby a write address counter 116 outputs a carry-out signal CO to the reset terminal R thereof. The Q output terminal of this set-reset flip-flop 140 applies a count enable signal CE to the AND circuit 138.

The read address counter 110 counts the read clock signals Pr applied by the read clock signal generator 173 and generates the read address signal. Here, the read clock signal generator 173 generates the read clock signal Pr on the basis of a reference clock signal CLKb applied by a reference clock signal generator 175 and a timing signal TMb applied by a control circuit 172.

The address signal generated by the read address counter 110 is applied to an address switch 119, a timing detector 139, and the zero detector 137. This zero detector 137 operates as a ring counter, and transmits a zero detection signal to the set terminal of the set-reset flip-flop 140 to set it, whenever the count value of the read address counter 110 reaches zero.

The count value of the read address counter 110 is also given to the timing detector 139. The timing detector 139 outputs the enable signal FE, when the count value reaches K {(N−1) / N}, where k denotes the count value of the read address counter 110 which corresponds to the final read address of the signal block. This enable signal FE is applied to the AND circuit 138 via the OR circuit 136 as already explained.

The write address counter 116 counts the write clock signals Pw outputted by the AND circuit 138 and generates an address signal to the address switch 119, when the AND condition of the AND circuit 138 is satisfied by the output of OR circuit 136 (i.e., the signal level enable signal LE or the enable signal FE), the write clock signal Pw, and the count enable signal CE, as already explained.

When the read/write signal R/W as shown in FIG. 12 applied from the control circuit 172 is at the high level, the address switch 119 gives the read address signal applied by the read address counter 110 to the memory 7a. Further, when the read/write signal R/W as shown in FIG. 12 applied from the control circuit 172 is at the low level, the address switch 119 gives the write address signal applied by the write address counter 116 to the memory 7a.

In the audio signal processing apparatus shown in FIG. 11, the recorded information including both the video signal and audio signal are reproduced from the recording medium at N-time speed, that is, within a short period T/N (N: 2 or more integer) shorter than the recording time T under the condition that the time-axis thereof is compressed by 1/N. Further, the large amplitude portions of the time-axis compressed audio signals are selected in sequence and stored in a memory with a capacity for storing the time-axis compressed audio signals of time length T/N. The time-axis compressed audio signals are read from the memory cyclically in such a way that the N-time extended reproduced audio signals of time length T can be obtained continuously on the time axis. Further, when the read address value reaches a predetermined write address value; that is, immediately before the memory quantity of the remaining time-axis compressed audio signals to be read as the reproduced audio signals reaches the quantity at which the reproduced audio signals are discontinued on the time axis, the new time-axis compressed audio signals are stored forcedly in the memory in such a way that once stored audio signals are not reproduced again.

Figure 15:
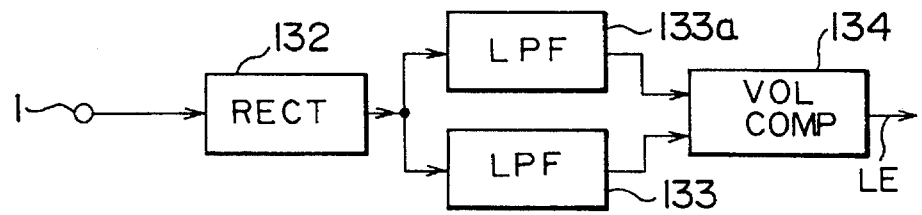
FIG. 15 is a block diagram showing another modification of the detecting means of the audio signal processing apparatus shown in FIG. 11.

FIG. 15 shows another modification of the signal level detecting means, which is different from the signal level detecting means shown in FIG. 11. In FIG. 11, the signal level detecting means is composed of the rectifier 132, the low-pass filter 133, the voltage comparator 134 and the retriggerable mono-stable multivibrator 135, to detect the time-axis compressed audio signal.

In the modification shown in FIG. 15, the time-axis compressed audio signal applied through the input terminal 1 is rectified by the rectifier 132, and then applied to both the low-pass filter 133 having a sufficiently long time constant and a low-pass filter 133a having a short time constant. Further, the output signals of both the low-pass filters 133 and 133a are applied to the voltage comparator 134.

Figure 16A:
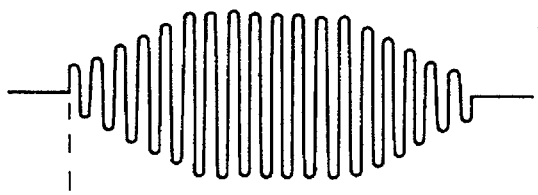
FIGS. 16A to 16D are views for assistance in explaining the operation of the audio signal processing apparatus shown in FIG. 11.
Figure 16B:
Figure 16C:
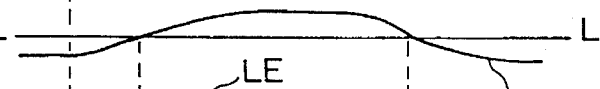
Figure 16D:
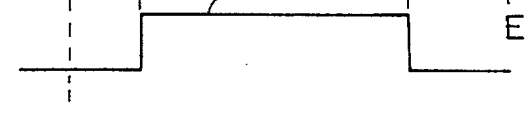

FIG. 16A shows the waveform of the time-axis compressed audio signal applied to the input terminal 1; FIG. 16B shows the waveform of the audio signal half-wave rectified by the rectifier 132; and the reference signal level L—L shown in FIG. 16C shows the waveform of the output signal of the low-pass filter 133 having a sufficiently long time constant. Further, a curve (an envelope detection output signal) E shown in FIG. 16C shows an output signal of the low-pass filter 133a having a short time constant.

In FIG. 15, the output signals of the two low-pass filters 133 and 133a are applied to the voltage comparator 134. The voltage comparator 134 compares the output signal E (the envelope detection output signal E) of the low-pass filter 133a having a short time constant with the reference output signal level L—L of the low-pass filter 133 having a sufficiently long time constant, and outputs a pulse signal LE as shown in FIG. 14D when the output level of the low-pass filter 133a is higher that the reference level L—L. The outputted pulse signal is applied to the AND circuit 138 via the OR circuit 136 both shown in FIG. 11 as the enable signal LE as it is.

In the signal level detecting means as shown in FIG. 15, a retriggerable mono-stable multivibrator 135 as shown in FIG. 11 is not necessary. However, when the multivibrator 135 is used, there exists such an advantage that a time delay caused when the leading edge of the audio signal is detected can be prevented, so that it is possible to reproduce the audio signal more preferably. Further, when the time constant τ of the retriggerable mono-stable multivibrator 135 is adjusted longer than the pronunciation time of a single sound in the ordinary conversation, it is possible to reproduce the intoned conversation for each single sound under excellent conditions.

As already explained, in FIGS. 13E to 13G, when the large amplitude portions S1, S2, S3 and S4 of the time-axis compressed audio signal of time length T applied through the input terminal 1 of the audio signal processing apparatus shown in FIG. 11 are present intermittently as shown in FIG. 13E, the reproduced audio signals S1e, S2e, S3e and S4e can be transmitted through the output terminal 15 as shown in FIG. 13G. In other words, when the large amplitude portions S1, S2, S3 and S4 of the time-axis compressed audio signal of time length T applied through the input terminal 1 of the audio signal processing apparatus shown in FIG. 11 are present intermittently as shown in FIG. 13E, the signal level enable signal LE is at the high level during the periods T1, T2, T3 and T4 as shown in FIG. 13F. Here, the signal level enable signal LE is generated by the detecting means composed of the rectifier 2, the low-pass filter 133, the voltage comparator 4, and the retriggerable mono-stable multivibrator 135, and then given from the retriggerable mono-stable multivibrator 135 to the AND circuit 138 via the OR circuit 136.

In FIG. 11, the count enable signal CE applied from the set-reset flip-flop 140 to the AND circuit 138 in FIG. 11 is at the high level from when the count value of the read address counter 110 is zero to when the carry-out signal CO is outputted by the write address counter 116 to the set-reset flip-flop 140. Further, the high-level enable signal FE is applied form the timing detector 139 to the AND circuit 138 via the OR circuit 136, from when the count value of the address counter 110 reaches K {(N–1) / N} (where K denotes the count value of the read address counter 110 which corresponds to the final read address) to when reaches K.

The AND circuit 138 gives the write clock signal Pw to the write address counter 116, when the signal level enable signal LE or the enable signal FE and the count enable signal CE are applied thereto. Therefore, the write address counter 116 generates the write address signal in the periods T1, T2, T3 and T4 as shown in FIG. 1F (which correspond to the large amplitude signal portions S1, S2, S3 and S4 of the time-axis compressed audio signals as shown in FIG. 13E). The generated write address signal is given to the memory 7a via the address switch 119, so that the digital signals corresponding to the large amplitude signal portions S1, S2, S3 and S4 of the time-axis compressed audio signal are stored in sequence in the areas of the memory 7a on the basis of the write clock signal Pw. Here, when all the digital signals corresponding to the time-axis compressed audio signal of time length T/N have been stored, a carry-out signal CO is generated from the write address counter 116 to the reset terminal R of the set-reset flip-flop 140, so that the count enable signal CE changes to the low level to stop the write clock signal Pw from being applied from the AND circuit 138 to the write address counter 116. As a result, the write operation to the memory 7a stops.

On the other hand, the read address counter 110 executes the counting operation continuously on the time axis to generate the read address signal. The read address signal is applied to the memory 7a via the address switch 119. Therefore, the digital signals corresponding to the large amplitude signal portions S1, S2, S3 and S4 of the time-axis compressed audio signal of a predetermined time length T written in the memory 7a in sequence (as shown in FIG. 13E) are read from the memory 7a on the basis of the read clock signal Pr having a period N-times longer than that of the write clock signal Pw, as the time-axis extended audio signals in which the time lengths T1.N, T2.N, T3.N and T4.N correspond to the large amplitude signal portions S1e, S2e, S3e, and S4e as shown in FIG. 13G.

Here, when the large amplitude signal portions S1, S2, S3 and S4 of the time-axis compressed audio signal of a predetermined time length T are present as shown in FIG. 13E, the storing areas of the memory 7a are used by the large amplitude signal portions S1, S2, S3 and S4 developing on the time axis in sequence. In this case, if the quantity of the large amplitude signal portions of the time-axis compressed audio signal of a predetermined time length T is small, since the quantity of the digital signals stored in the memory 7a is small, there exists a problem in that the read address passes the write address so that the digital signal once read is read again.

In the audio signal processing apparatus shown in FIG. 11, however, as already explained, the count value of the read address counter 110 is given to the timing detector 139, and the timing detector 139 outputs the high-level enable signal FE to the AND circuit 138 via the OR circuit 136 from when the count value of the address counter 110 reaches K {(N−1) /N} (where K denotes the count value of the read address counter 110, which corresponds to the final read address) to when reaches K. Therefore, even if the signal level enable signal LE changes to the low level within this period, since the write clock signal Pw is applied from the AND circuit 138 to the write address counter 116, the digital signals corresponding to the time-axis compressed audio signal are written in the memory 5a forcedly during the period, so that it is possible to overcome the above-mentioned problem.

Further, if the signal level enable signal LE changes to the high level within the period when the enable signal FE is at the high level, there arises no problem. Further, when the stored quantity of the memory 7a reaches a predetermined value and thereby the count enable signal CE applied from the set-reset flip-flop 140 to the AND circuit 139 is changed to the low level by the carry-out signal CO inputted by the write address counter 116, even if the enable signal FE changes to the high level, since the AND condition cannot be established by the AND circuit 138, the enable signal FE is disabled.

As described above, in the third embodiment of the present invention, when the audio signal is reproduced by the VTR at high speed, it is possible to hear the reproduced audio signal required for the viewer not only clearly but also at high hearing density (only the necessary audio information). In addition, since the time offset between the reproduced image information contents and the reproduced audio information contents can be reduced, the artificiality can be reduced. Further, immediately before the remaining quantity of the stored time-axis compressed audio signals (to be read for reproduction) pauses on the time axis, since the newly time-axis compressed audio signal can be stored forcedly in the memory, it is possible to prevent once reproduced audio signal from being reproduced again, thus realizing an excellent audio information reproduction.

Figure 17:
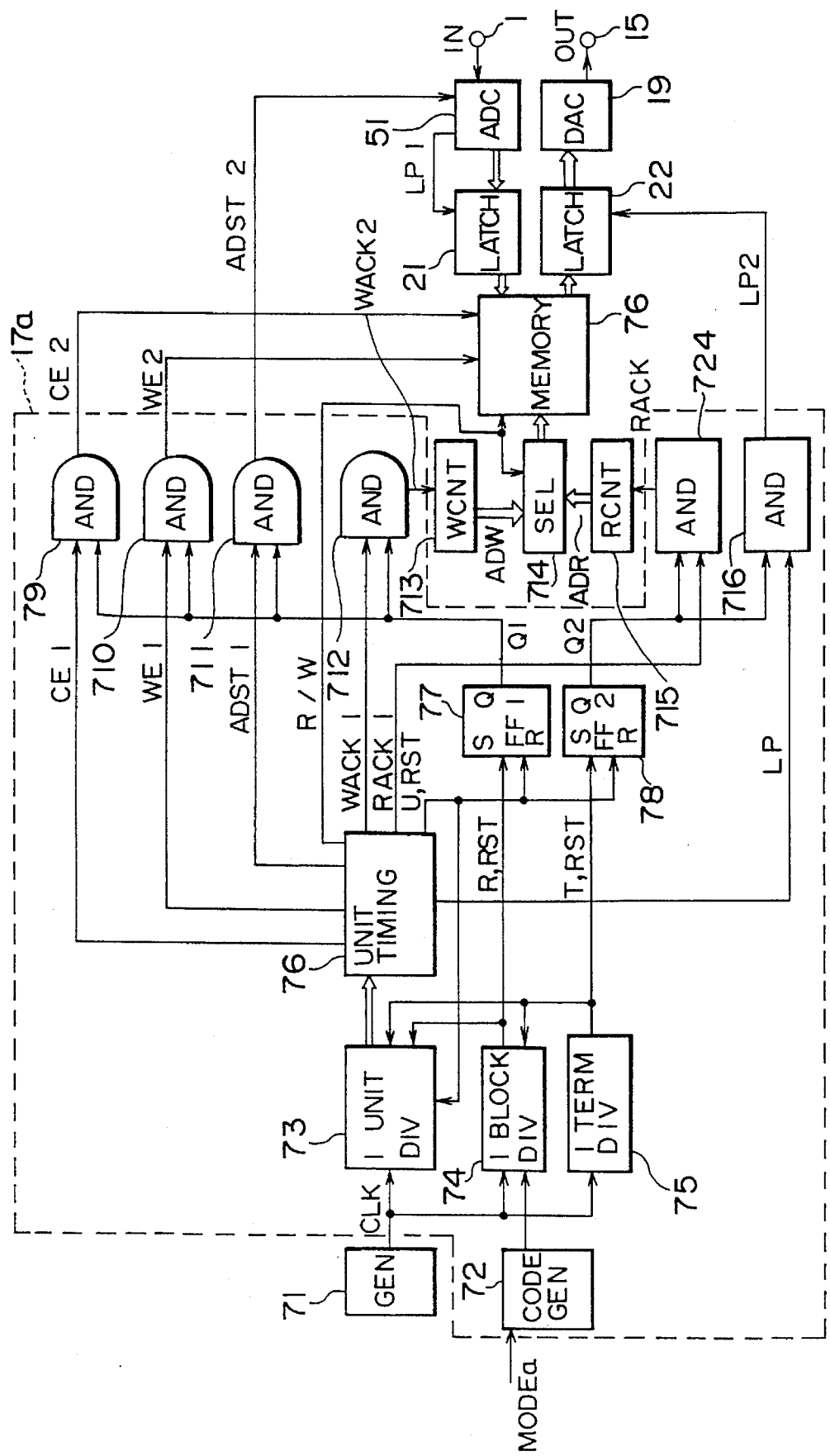
FIG. 17 is a block diagram showing a fourth embodiment of the audio signal processing apparatus according to the present invention.

FIG. 17 shows a fourth embodiment of the present invention, in which an area 17a enclosed by dashed lines indicates another modification of the timing signal generating circuit 17 shown in FIG. 11.

In the audio signal processing apparatus shown in FIG. 17, a reference clock signal generator 71 can generate a reference clock signal CLK at such a frequency as follows: when any predetermined integer ratio of the reproducing speed (the relative linear speed between the recorded medium and the reproducing element) to the recording speed (the relative linear speed between the recording medium and the recording element) is selected, it is possible to easily obtain the read clock signal for reading the audio signals (reproduced from the recording medium under the time-axis compressed conditions according to the selected relative linear speed ratio and further stored intermittently) at a predetermined constant frequency, irrespective of the reproduction speed.

Now, when the audio signal is reproduced, any one of the integer ratios (e.g., 1, 2, 3, 5 and 7 times) of the reproduction speed (the relative linear speed between the recorded medium and the reproducing element) to the recording speed (the relative linear speed between the recording medium and the recording element) is selected. In this case, even if any ratio of the reproduction speed to the recording speed is selected, it is preferable to obtain a constant-frequency (f) read clock signal at a division ratio corresponding to the relative linear speed ratio. Therefore, the frequency of the reference clock signal CLK generated by the oscillator 71 is determined as follows:

First, the relationship between the above-mentioned constant frequency f of the clock signal and the frequency fr for generating the frequency (f) clock signal without any distortion is fr>2f on the basis of the sampling theorem. In this case, the frequency fs of the reference clock signal CLK can be determined by multiplying the read clock signal frequency fr by a numerical value (P×210) obtained by multiplying a numerical value P (natural number) by the least common multiple (210) of the numerical values 1, 2, 3, 5, and 7 of the integer ratios of the above-mentioned different relative linear speeds; that is, fs=fr×P×210.

Here, if the natural number P is 1, since the least common multiple of the numerical values 1, 2, 3, 5 and 7 is 210, the frequency fs of the reference clock signal CLK to be generated is 210 fr.

In FIG. 17, a basic timing pattern period generator 73 counts the reference clock signal CLK generated by an oscillator 71, and resets the reference clock signal CLK for each 30 count value; that is, divides the reference clock signal CLK into 30, for instance in the case of the above-mentioned example, to generate basic timing pattern periods.

Figure 18:
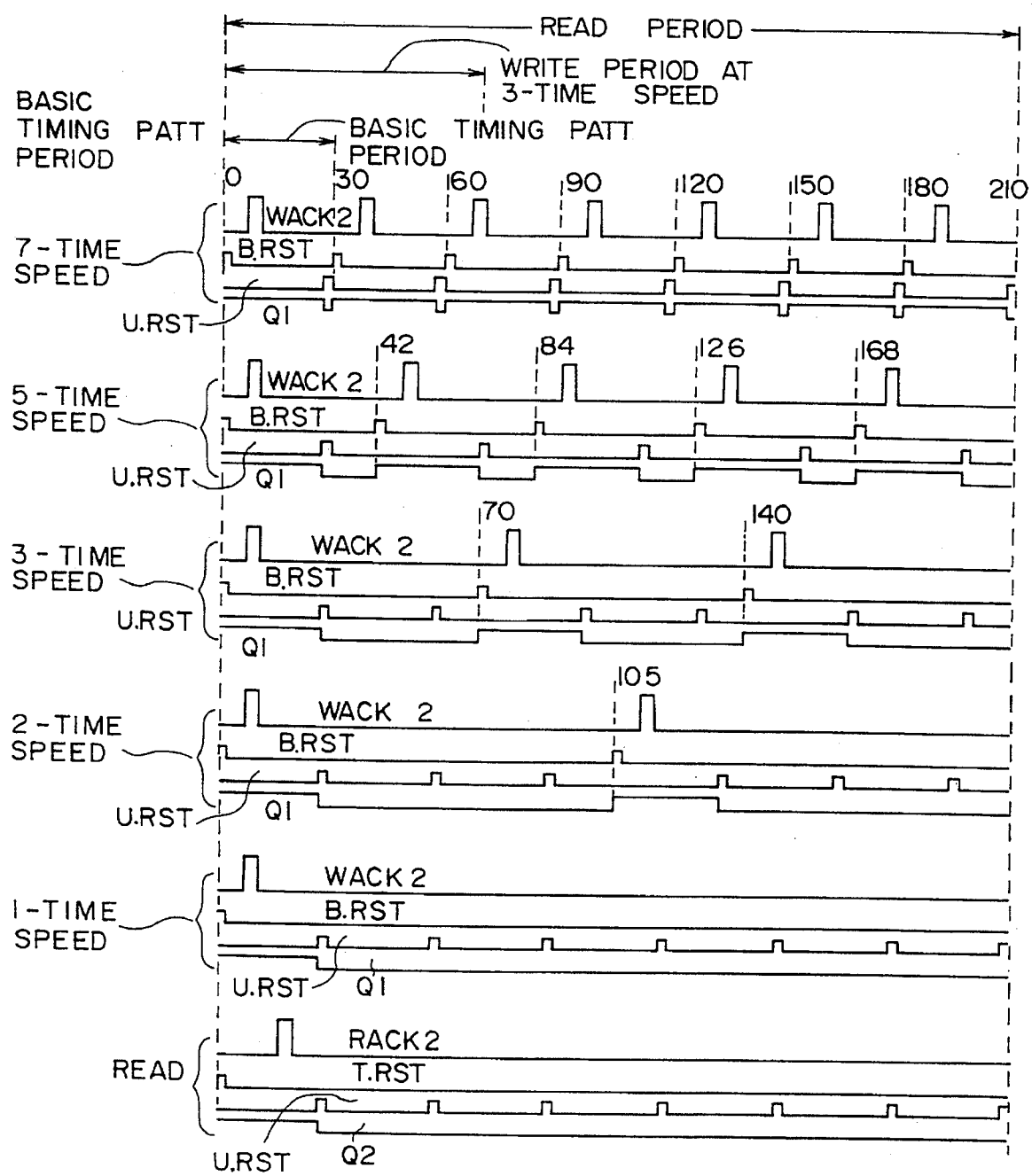
FIG. 18 is a timing chart for assistance in explaining the operation of the audio signal processing apparatus shown in FIG. 17.

Further, a code generator 72 converts the mode signal MODEa indicative of a reproduction speed and a reproduction direction (both set externally) into a code corresponding to the set reproduction speed mode, and applies the converted code to a write period generator 74. As shown in FIGS. 18, when the reproduction speed mode is 7 time speed, for instance, the code generated by the code generator 72 is a numeral 30 indicative of the write period corresponding to the 7 time speed; when the reproduction speed mode is 5 time speed, for instance, the code is a numeral 42 indicative of the write period corresponding to the 3 time speed; when the reproduction speed mode is 5 time speed, for instance, the code is a numeral 70 indicative of the write period corresponding to the 3 time speed; when the reproduction speed mode is 2 time speed, for instance, this code is a numeral 105 indicative of the write period corresponding to the 2 time speed; and when the reproduction speed mode is 1 time speed, for instance, this code is a numeral 210 indicative of the write period corresponding to the 1 time speed.

Further, the write period generator 74 counts the number of the reference clock signals CLK applied by the oscillator 71 by an internal counter, and sets the internal counter whenever the count value reaches the numerical write period value indicated by the codes applied by the code generator 72. In other words, the write period generator 74 divides the reference clock signal CLK applied by the oscillator 71 into 30 when the reproduction speed mode is 7 time speed, for instance; into 42 when the reproduction speed mode is 5 time speed; into 70 when the reproduction speed mode is 3 time speed, for instance; and into 105 when the reproduction speed mode is 2 time speed.

Further, a reset pulse B.RST (as shown in FIGS. 17 and 18) generated when the write period generator 74 ends one write period resets the basic timing pattern period generator 73, so that the write period generator 74 and the basic timing pattern period generator 73 can operate in synchronism with each other.

A read period generator 75 divides the reference clock signals CLK generated by the oscillator 71 into 210. That is, this read period generator 75 resets itself and outputs a reset pulse T.RST to the basic timing pattern period generator 73 and the write period generator 74, immediately before the count value of reference clock signal CLK reaches 210. Therefore, the read period generator 75, the write period generator 74, and the basis timing pattern period generator 73 are all activated in synchronism with each other.

Figure 19:
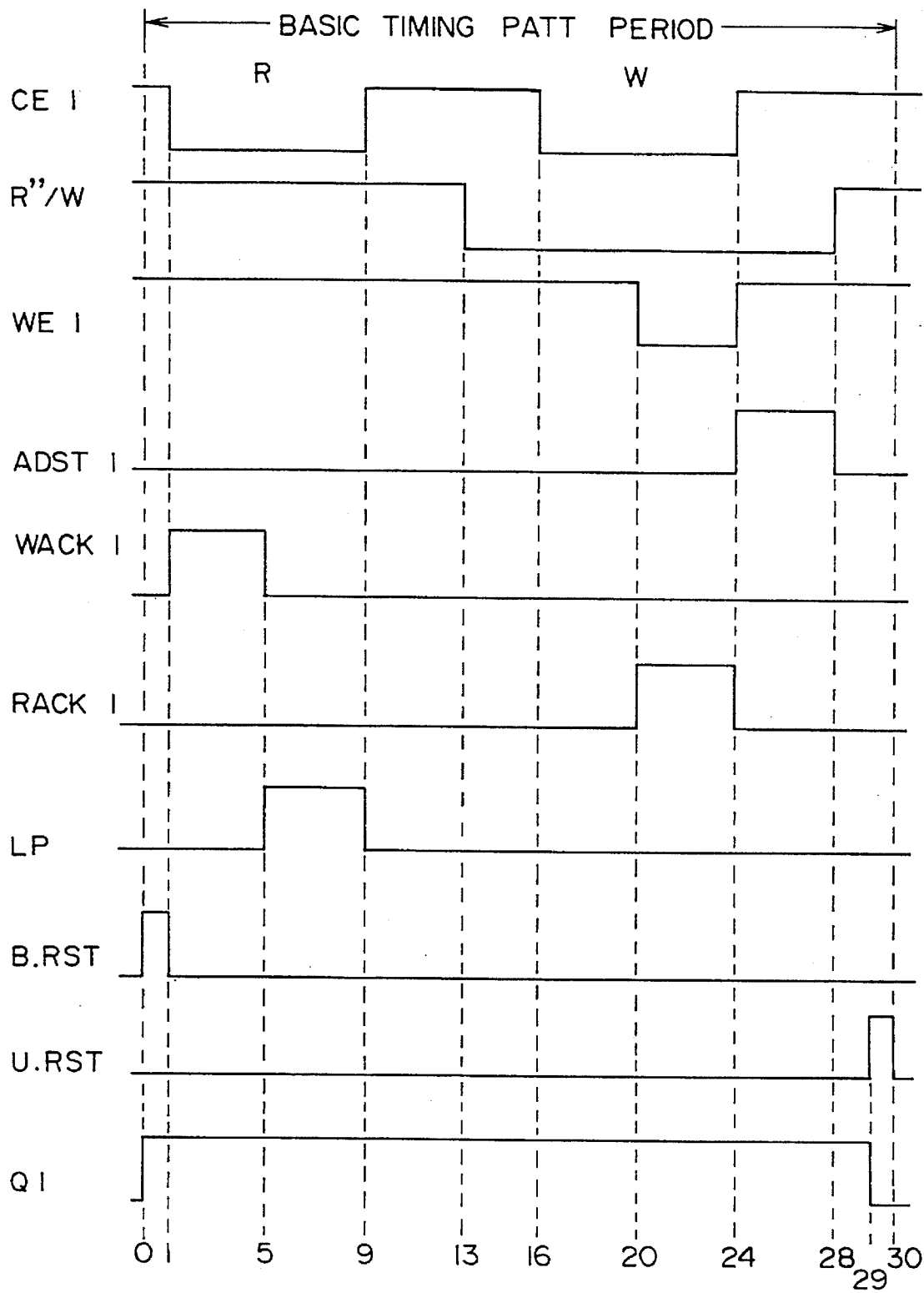
FIG. 19 is a timing chart for assistance in explaining the operation of the audio signal processing apparatus shown in FIG. 17.

The count value of the timing pattern period generator 73 is applied to the basic timing pattern generator 76. Therefore, the basic timing pattern generator 76 generates a chip enable signal CE1, an address mode signal R/W, a write enable signal WE1, an A/D start pulse ADST1, a write address clock signal WACK1, a read address clock signal RACK1, a D/A latch pulse LP, and a unit reset pulse signal U.RST, all as shown in FIG. 19.

The reset pulse B.RST generated by the write period generator 74 is applied to the set terminal of a flip-flop 77. The flip-flop 77 is reset by a unit reset pulse U.RST outputted by the basic timing pattern generator 76, and outputs a signal Q1 as shown in FIG. 19 from a Q output terminal thereof. An AND circuit 712 obtains a logical product of the signal Q1 outputted by the flip-flop 77 and the write address clock signal WACK1 outputted by the basic timing pulse generator 76. The AND circuit 712 generates only one write address clock signal WACK2 during the one write period, because even if the write address clock signal WACK1 is outputted by the basic pattern period generator 73 within the write period, the write address clock WACK2 is not generated as shown in FIG. 18 after the unit reset pulse U.RST is outputted by the basic timing pattern generator 76 and before the reset pulse B.RST is generated when the write period generator 74 ends one write period.

Further, an AND circuit 79 obtains a logical AND product of the signal Q1 outputted by the Q output terminal of the flip-flop 77 and the chip enable signal CE1 outputted by the basic timing pattern generator 76, and outputs a chip enable signal CE2. Further, an AND circuit 710 obtains a logical AND product of the signal Q1 outputted by the Q output terminal of the flip-flop 77 and the write enable signal WE1 outputted by the basic timing pattern generator 76, and outputs a write enable signal WE2. Further, an AND circuit 711 obtains a logical AND product of the signal Q1 outputted by the Q output terminal of the flip-flop 77 and the A/D start pulse ADST1 outputted by the basic timing pattern generator 76, and outputs an A/D start pulse ADST2. These output signals CE2, WE2 and ADST2 all have a period the same as that of the write address clock signal WACK2 (however, the phase is different from each other).

On the other hand, in the audio signal processing apparatus shown in FIG. 17, the time-axis compressed audio signal applied through an input terminal 1 is given to an A-D converter 5, after the gain of the audio signal is adjusted by a gain control circuit (not shown). On the basis of an AD conversion pulse ADST2 applied by the AND3 circuit 711, the A-D converter 5 converts the time-axis compressed audio signal into digital signals each having predetermined bits for each predetermined sampling period, and outputs the converted digital signals to a latch circuit 21.

The latch circuit 21 latches the digital signals outputted by the A-D converter 5 for each sampling period in sequence on the basis of a latch pulse LP1 applied by the A-D converter 5 whenever the AD conversion operation ends. The digital signals latched by the latch circuit 21 are given to the memory 7b and written in the memory areas at the addresses designated by the write address signal ADW applied by the write address counter 713 via an address switch 714.

When the R/W signal (shown in FIG. 19) generated by the basic timing pattern generator 76 is at the low level, the address switch 714 applies the write address signal ADW outputted by the write address counter 713 to the memory 7b. Further, when the R/W signal generated by the basic timing pattern generator 76 is at the high level, the address switch 714 applies the read address signal ADR outputted by the read address counter 715 to the memory 7b.

The write operation of the digital signals to the memory 7b is effected when the chip enable signal CE2 outputted by the AND circuit 79 and the write enable signal WE2 outputted by the AND circuit 710 are both at the low level, so that the digital signals latched by the latch circuit 21 are written in the memory 7b.

Further, the timing control of the read address clock signal is effected by the operation of the flip-flop 78 which is set in response to the reset pulse T.RST and reset in response to the unit reset pulse U.RST outputted by the basic timing pattern generator 76. In more detail, the AND circuit 724 obtains a logical product of the signal Q2 outputted by the Q output terminal of the flip-flop 78 and the read address clock signal RACK1 outputted by the basic timing pattern generator 76. The AND circuit 724 generates only one read address clock signal RACK2 during the one read period, because even if the read address clock signal RACK1 is outputted by the basic pattern period generator 76 within the read period, the read address clock RACK2 is not generated as shown in FIG. 18, after the unit reset pulse U.RST is outputted by the basic timing pattern generator 76 and before the reset pulse T.RST is generated when the read period generator 75 ends one read period.

Further, an AND circuit 716 obtains a logical AND product of the signal Q2 outputted by the Q output terminal of the flip-flop 78 and the D/A latch pulse LP outputted by the basic timing pattern generator 76, and outputs a D/A latch pulse LP2. The D/A latch pulse LP2 has a period the same as that of the read address clock signal RACK2 (however, the phase is different from each other).

The digital signals written in the memory 7b are read from the memory areas at the addresses designated by the read address signal ADR applied by the read address counter 715 via the address switch 714 to the memory 7b, when the R/W signal generated by the basic timing pattern generator 76 are at the high level; the chip enable signal CE2 outputted by the AND1 circuit 79 is at the low level; and the write enable signal WE2 outputted by the AND2 circuit 710 is at the high level. The digital signals read from the memory 7b are given to the latch circuit 22, and latched by the latch circuit 22 on the basis of the D/A latch pulse LP2 applied by the AND6 circuit 716. The digital signals latched by the latch circuit 22 are given to a D-A converter 9, and then transmitted through an output terminal 15 as the reproduced audio signal.

The memory 7b as described above must have a memory capacity more than necessary for storing audio signal reproduced from the recording medium at N-time speed, that is, the 1/N-time time-axis compressed audio signals of a time length of T/N sec for each the predetermined block of time length T. That is, the entire time-axis compressed audio signals of a time length T/N sec must be stored cyclically for each predetermined time length T sec on the time axis in the memory 7b.

Further, the write and read operation to and from the memory 7b are effected to and from the memory areas cyclically designated by the address signal applied by the write address counter 713 and the read address counter 715 via the address switch 714 to the memory 7b.

Further, when the write address counter 713 is operated as a subtracter, it is possible to output the audio signal audibly even if the audio signals are reproduced in the reverse direction at high speed. This is because since the written audio signals are read from the memory 7b by the addition operation of the read address counter 715, the time axis thereof can be reversed.

In the timing chart shown in FIG. 18, when the reproduction speed is 7 times higher than the recording speed, the write period (30) is ⅐ times shorter than the read period (210); when the reproduction speed is 5 times higher than the recording speed, the write period (42) is ⅕ times shorter than the read period (210); when the reproduction speed is 3 times higher than the recording speed, the write period (70) is ⅓ times shorter than the read period (210); when the reproduction speed is 2 times higher than the recording speed, the write period (105) is ½ times shorter than the read period (210); and when the reproduction speed is the same as the recording speed, the write period (210) is the same as the read period (210).

In FIG. 18, even if the reproduction speed is changed to any of a plurality of kinds (5 modes in this embodiment), that is, increased to any of N (7, 5, 3, 2 and 1) times of the recording speed, the signal modes (waveforms) during the respective time length (shown as the basic timing pattern period) can be kept unchanged (only the phases are different for each other), irrespective of the speed ratio of the reproduction speed to the recording speed.

In other words, in FIG. 18, the signal modes during the time length of the basic timing pattern period are a series of various basic control signals used to write the 1/N-time time-axis compressed audio signals reproduced at the highest reproduction speed (7 times in this embodiment) and to read the N-time time-axis extended audio signals as the original audio signals. Further, a group of the basic control signals are used N times repeatedly during one read period.

In the example shown in FIG. 18, since the speed ratios of the reproduction speed to the recording speed are five different kinds of N(5) times of 7, 5, 3, 2 and 1, the basic control signals correspond to those required at the highest (7 times) reproduction speed. Therefore, when the basic timing pattern period is 30, the write period at various speed reproduction are as follows as shown in FIG. 18:

Write period at 7-time speed reproduction=basic timing pattern period 30

Write period at 5-time speed reproduction=basic timing pattern period 30+non-pulse period 12

Write period at 3-time speed reproduction=basic timing pattern period 30+non-pulse period 40

Write period at 2-time speed reproduction=basic timing pattern period 30+non-pulse period 75

Write period at 1-time speed reproduction=basic timing pattern period 30+non-pulse period 180

Therefore, it is possible to obtain the periods of the respective write clock signals at various multiple-time reproduction speeds by combination of the basic timing patterns.

Further, in the read clock signal, the basic timing pulse is generated once during the read period. Further, it is of course necessary to generate the write and read clock signals so as not to be overlapped on the time axis. Further, here, the basic timing pattern includes the memory write timing pulse, the memory read timing pulse, the address mode signal, the A/D start pulse, the D/A latch timing pulse, and the unit-itself reset pulse, in addition to the write and read clock signal.

As described above, in the fourth embodiment of the present invention, when reproduced at high speed, the audio signal can be heard under excellent conditions at the ordinary pitch in a wide reproduction speed range without being subjected to any limitation of the locking range of PLL. Further, since being composed of digital circuits, the circuits can be easily formed as an IC chip to reduce the cost thereof. Further, since the read frequency is constant at various reproduction speeds without producing any pitch offset in the outputted audio signal, there exists such an advantage that the continuous reproduction time of a series of blocks can be kept constant.

What is claimed is:

1. An audio signal processing apparatus comprising:

first conversion means for converting a first analog audio signal to digital audio signals, the first analog audio signal having been stored in a recording medium in a predetermined recording order and being reproduced therefrom in a reverse order of the recording order and at a speed $\alpha$ ($\alpha \geq 1$) times higher than a recording speed to the recording medium;

a memory that stores the digital audio signals into addresses having predetermined head and final addresses;

control means for controlling writing and reading the digital audio signals to and from the memory; and second conversion means for converting the digital audio signals read from the memory to a second analog audio signal which is to be an output of the audio signal processing apparatus, wherein the control means comprises:

read address control means for controlling read addresses of the memory from which the stored digital audio signals are read out such that the read addresses repeatedly reciprocate between the head and final addresses, wherein, the control means controls the writing such that, if $\alpha>1$, the writing starts in sequence from the head or final address when the read address reaches in the vicinity of an address which advances by $(\alpha-1)/\alpha$ of all the addresses having returned at the head or final address, or whereas if $\alpha=1$, the writing starts in sequence from the head or final address immediately after the read address returning at the head or final address.

2. An audio signal processing apparatus comprising:

first conversion means for converting a first analog audio signal to digital audio signals, the first analog audio signal having been stored in a recording medium in a predetermined recording order and being reproduced therefrom in the same order as the recording order and at a speed $\alpha$ ($\alpha>1$) times higher than a recording speed to the recording medium;

a memory that stores the digital audio signals into addresses having predetermined head and final addresses;

control means for controlling writing and reading the digital audio signals to and from the memory; and second conversion means for converting the digital audio signals read from the memory to a second analog audio signal which is to be an output of the audio signal processing apparatus, wherein the control means comprises:

read address control means for controlling read addresses of the memory from which the stored digital audio signals are read out such that the read addresses repeatedly reciprocate between the head and final addresses, wherein, the control means controls the writing such that, if $\alpha>1$, the writing starts in sequence from the head or final address when the read address reaches in the vicinity of the head or final address.

3. The apparatus according to claim 1, wherein the address control means comprises:

a read address counter that counts up the read address beginning from the head address and generates a final address signal when the read address becomes the final address, and counts down the read address beginning from the final address and generates a head address signal when the read address becomes the head address, the counter starting the count-up operation when generating the head address signal, whereas starting the count-down operation when generating the final address signal; and the control means further comprises:

generating means for generating a predetermined write start address in response to the head or final address signal;

a comparator that compares the write start address and the read address counted by the counter; and a write address counter that repeatedly counts up and down a write address beginning from the head or final address in response to the comparison result.

* * * * *